(12) United States Patent
Sugiura et al.

(10) Patent No.: US 7,745,062 B2
(45) Date of Patent: Jun. 29, 2010

(54) FUEL CELL HAVING COOLANT INLET AND OUTLET BUFFERS ON A FIRST AND SECOND SIDE

(75) Inventors: Seiji Sugiura, Utsunomiya (JP); Shuhei Goto, Utsunomiya (JP); Masahiro Mouri, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 951 days.

(21) Appl. No.: 10/533,182

(22) PCT Filed: Oct. 28, 2003

(86) PCT No.: PCT/JP03/13755

§ 371 (c)(1),
(2), (4) Date: Apr. 27, 2005

(87) PCT Pub. No.: WO2004/038840

PCT Pub. Date: May 6, 2004

(65) Prior Publication Data

US 2006/0003206 A1    Jan. 5, 2006

(30) Foreign Application Priority Data

Oct. 28, 2002   (JP)   ............................. 2002-313242
Nov. 18, 2002   (JP)   ............................. 2002-333742

(51) Int. Cl.
*H01M 8/04*    (2006.01)
*H01M 2/14*    (2006.01)

(52) U.S. Cl. ....................... 429/512; 429/452; 429/456; 429/457; 429/437

(58) Field of Classification Search ....................... None
See application file for complete search history.

(56) References Cited

U.S. PATENT DOCUMENTS

| | | | |
|---|---|---|---|
| 5,230,966 A * | 7/1993 | Voss et al. | 429/26 |
| 5,998,055 A | 12/1999 | Kurita et al. | |
| 6,410,178 B1 | 6/2002 | Matsukawa et al. | |
| 6,528,196 B1 | 3/2003 | Fujii et al. | |

(Continued)

FOREIGN PATENT DOCUMENTS

EP    1100140 B1    5/2001

(Continued)

OTHER PUBLICATIONS

Machine translation of JP 2000-164230, Sha et al., Jun. 16, 2000.*

(Continued)

*Primary Examiner*—Dah-Wei D Yuan
*Assistant Examiner*—Kwang Han
(74) *Attorney, Agent, or Firm*—Lahive & Cockfield, LLP; Anthony A. Laurentano, Esq.

(57) ABSTRACT

A separator comprises a first and second metal plates laid over each other. A cooling medium flow passage is integrally provided between the first and second metal plates. The cooling medium flow passage has inlet buffer portions communicating with a cooling medium inlet communication hole, outlet buffer portions communicating with a cooling medium outlet communication hole, and linear flow passage grooves linearly extending in the direction of arrow B and that of arrow C.

15 Claims, 28 Drawing Sheets

U.S. PATENT DOCUMENTS

| | | |
|---|---|---|
| 7,413,821 B2 | 8/2008 | Sugiura et al. |
| 2001/0019793 A1 | 9/2001 | Tsuyoshi |
| 2001/0044042 A1* | 11/2001 | Inoue et al. .................. 429/35 |
| 2002/0055031 A1 | 5/2002 | Fujii et al. |
| 2003/0129475 A1* | 7/2003 | Enjoji et al. .................. 429/38 |
| 2004/0126634 A1 | 7/2004 | Hatoh et al. |

FOREIGN PATENT DOCUMENTS

| | | |
|---|---|---|
| JP | 08-222237 | 8/1996 |
| JP | 2000-164230 | 6/2000 |
| JP | 2000-323149 | 11/2000 |
| JP | 2001-52723 | 2/2001 |
| JP | 2001-118588 | 4/2001 |
| JP | 2002-075395 | 3/2002 |
| JP | 2002-260710 | 9/2002 |
| WO | WO 00/31815 A1 | 6/2000 |
| WO | WO-02/47190 A1 | 6/2002 |

OTHER PUBLICATIONS

European Search Report for Application No. 03758972.8-1227, dated Feb. 13, 2008.

Japanese Office Action for Application No. 2005-313242, dated Feb. 17, 2009.

* cited by examiner

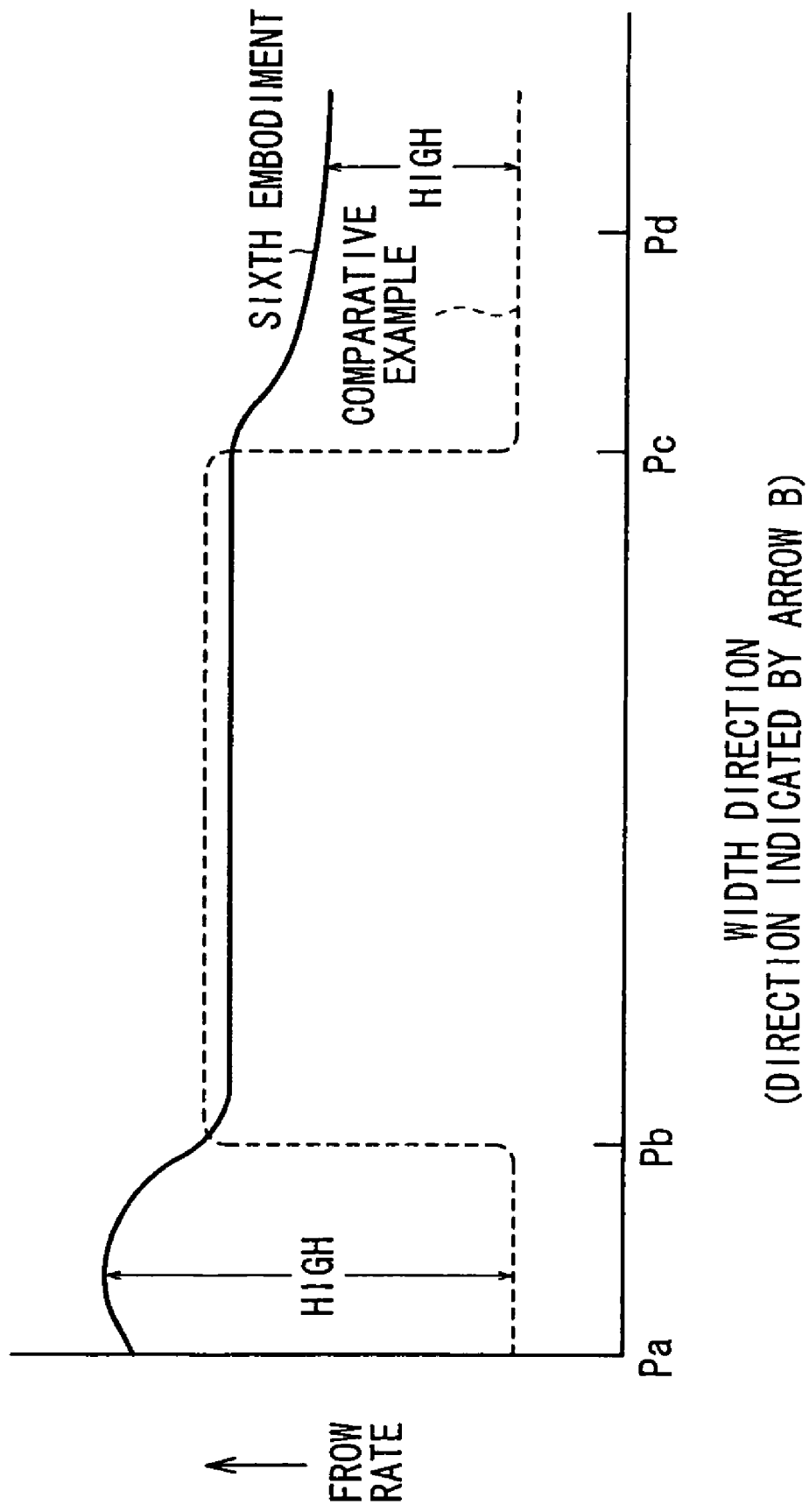

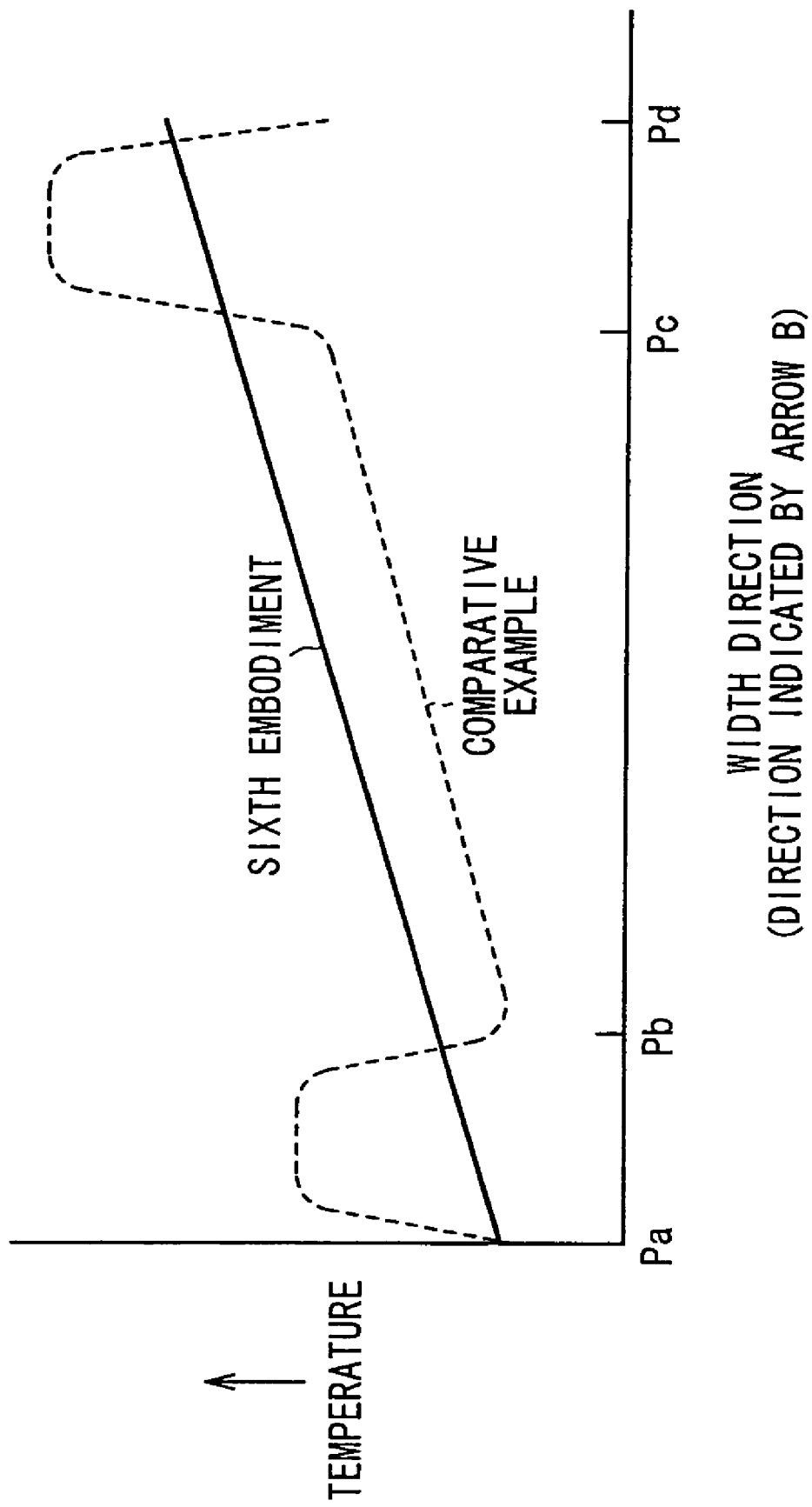

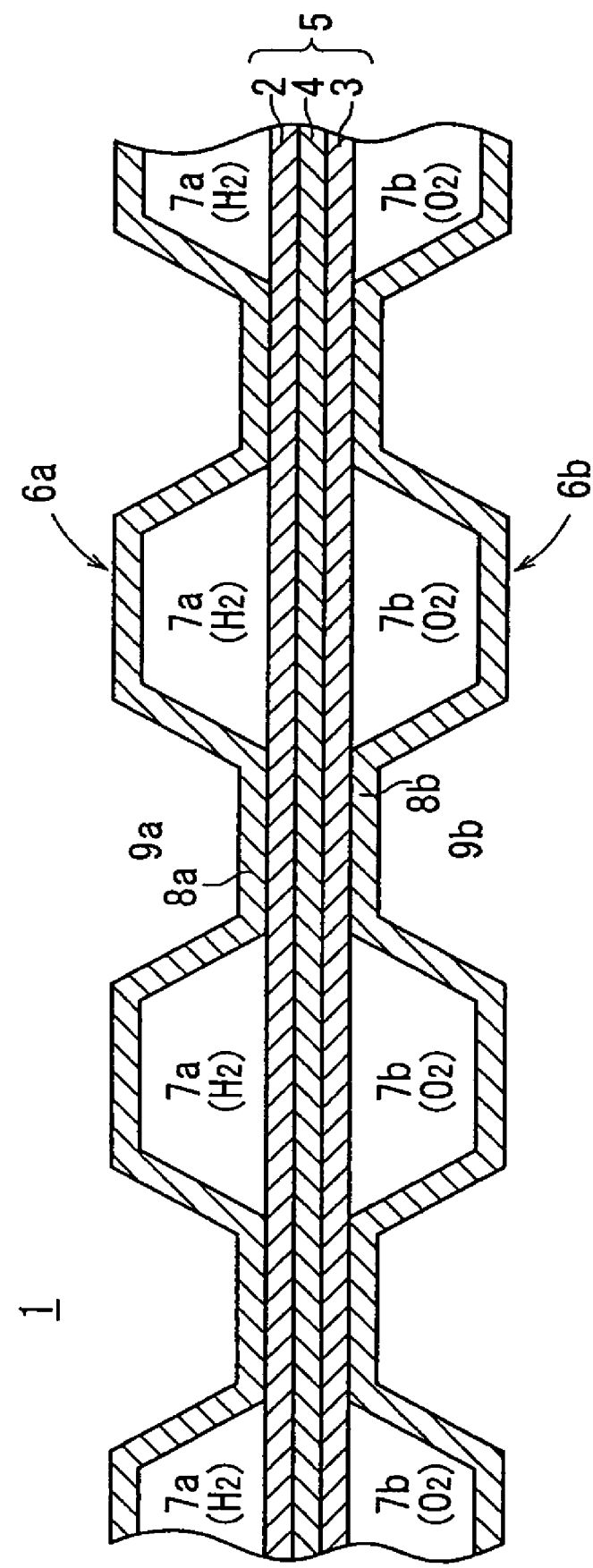

FUEL CELL HAVING COOLANT INLET AND OUTLET BUFFERS ON A FIRST AND SECOND SIDE

RELATED APPLICATIONS

This application is a 35 U.S.C. 371 national stage filing of International Application No. PCT/JP2003/13755, filed 28 Oct. 2003, which claims priority to Japanese Patent Application No. 2002-313242 filed on 28 Oct. 2002, and Japanese Patent Application No. 2002-333742 filed 18 Nov. 2002. The contents of the aforementioned applications are hereby incorporated by reference.

BACKGROUND OF THE INVENTION

1. Technical Field

The present invention relates to a fuel cell formed by alternatively stacking an electrolyte electrode assembly and separators. The electrolyte electrode assembly includes an anode, a cathode, and an electrolyte interposed between the anode and the cathode.

2. Background Art

For example, a solid polymer fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas (reactant gas) such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electrical energy. An oxidizing gas (reactant gas) such as a gas chiefly containing oxygen (hereinafter also referred to as the oxygen-containing gas) is supplied to the cathode. At the cathode, the hydrogen ions from the anode combine with the electrons and oxygen to produce water.

In the fuel cell, a fuel gas flow field (reactant gas flow field) is formed on a surface of the separator facing the anode for supplying the fuel gas to the anode. An oxygen-containing gas flow field (reactant gas flow field) is formed on a surface of the separator facing the cathode for supplying the oxygen-containing gas to the cathode. Further, a coolant flow field is provided between the anode side separator and the cathode side separator such that a coolant flows along the surfaces of the separators.

Normally, the separators of this type are formed of carbon material. However, it has been found that it is not possible to produce a thin separator using the carbon material due to factors such as the strength. Therefore, recently, attempts to reduce the overall size and weight of the fuel cell using a separator formed of a thin metal plate (hereinafter also referred to as the metal separator) have been made (see Japanese Laid-Open Patent Publication No. 8-222237). In comparison with the carbon separator, the metal separator has the higher strength, and it is possible to produce a thin metal separator easily. The desired reactant flow field can be formed on the metal separator under pressure to achieve the reduction in thickness of the metal separator.

For example, a fuel cell 1 shown in FIG. 28 includes a membrane electrode assembly 5 and a pair of metal separators 6a, 6b sandwiching the membrane electrode assembly 5. The membrane electrode assembly 5 includes an anode 2, a cathode 3, and an electrolyte membrane 4 interposed between the anode 2 and the cathode 3.

The metal separator 6a has a fuel gas flow field 7a for supplying a fuel gas such as a hydrogen-containing gas on its surface facing the anode 2. The metal separator 6b has an oxygen-containing gas flow field 7b for supplying an oxygen-containing gas such as the air on its surface facing the cathode 3. The metal separators 6a, 6b have planar regions 8a, 8b in contact with the anode 2 and the cathode 3. Further, coolant flow fields 9a, 9b as passages of a coolant is formed on back surfaces (surfaces opposite to the contact surfaces) of the planar regions 8a, 8b.

However, in the metal separators 6a, 6b, the shapes of the coolant flow fields 9a, 9b are determined inevitably based on the shapes of the fuel gas flow field 7a and the oxygen-containing gas flow field 7b. In particular, in an attempt to achieve the long grooves, assuming that the fuel gas flow field 7a and the oxygen-containing gas flow field 7b comprise serpentine flow grooves, the shapes of the coolant flow fields 9a, 9b are significantly constrained. Therefore, it is not possible to supply the coolant along the entire surfaces of the metal separators 6a, 6b. Thus, it is difficult to uniformly cool the electrode surfaces, and achieve the stable power generation performance.

In view of the above, for example, Japanese Laid-Open Patent Publication 2002-75395 discloses a separator of a fuel cell. The separator is a metal separator, and includes two corrugated metal plates having gas flow fields, and a corrugated metal intermediate plate sandwiched between the two metal plates. The metal intermediate plate has coolant water flow fields on both surfaces.

However, according to the disclosure of Japanese Laid-Open Patent Publication 2002-75395, the metal separator has three metal plates including the two metal plates having gas flow fields, and the one intermediate metal plate having the coolant flow fields on its both surfaces. Therefore, in particular, when a large number of metal separators are stacked to form the fuel cell stack, the number of components of the fuel cell stack is large, and the dimension in the stacking direction of the metal separators is large. Thus, the overall size of the fuel cell stack is large.

SUMMARY OF THE INVENTION

The present invention solves this type of problem, and an object of the present invention is to provide a fuel cell having a simple structure in which a coolant flows in a surface of a separator uniformly, and the desired power generation performance is achieved.

In a fuel cell of the present invention, an electrolyte electrode assembly and separators are stacked alternately, and the separator at least includes first and second metal plates stacked together. The first metal plate has an oxygen-containing gas flow field including a curved flow passage for supplying an oxygen-containing gas along a cathode, and the second metal plate has a fuel gas flow field including a curved flow passage for supplying a fuel gas along the anode.

Further, a coolant flow field including two or more inlet buffers connected to the coolant supply passage, two or more outlet buffers connected to the coolant discharge passage, and straight flow grooves connected between the two or more inlet buffers and the two more outlet buffers is provided between the first and second metal plates.

The coolant between the first and second metal plates flows separately from the coolant supply passage into the two or more inlet buffers, flows through the straight flow grooves into the two or more outlet buffers, and is discharged into the coolant discharge passage.

Therefore, the coolant flows in the surface of the separator uniformly, and cools electrode surfaces uniformly. Thus, the stable power generation performance of the fuel cell can be achieved.

Further, in a fuel cell of the present invention, an electrolyte electrode assembly and separators are stacked alternately, and the separator at least includes first and second metal plates stacked together, and a coolant flow field is formed between the first and second metal plates. The coolant flow field includes two or more inlet buffers connected to the coolant supply passage through inlet connection passages, two or more outlet buffers connected to the coolant discharge passage through outlet connection passages, and flow grooves connected between the two or more inlet buffers and the two or more outlet buffers.

Further, at least the number of grooves in a first inlet connection passage connecting the first inlet buffer to the coolant supply passage and the number of grooves in a second inlet connection passage connecting the second inlet buffer to the coolant supply passage are different, and at least the number of grooves in a first outlet connection passage connecting the first outlet buffer to the coolant discharge passage and the number of grooves in a second outlet connection passage connecting the second outlet buffer to the coolant discharge passage are different.

Therefore, the stagnation of the flow of the coolant due to the pressure equilibrium in the coolant flow field is prevented. Thus, the desired flow rate and the desired flow condition of the coolant in the coolant flow field are achieved. Accordingly, the coolant flows in the separator surface uniformly, and cools the entire electrode surface uniformly. Thus, the stable power generation performance can be achieved.

BRIEF DESCRIPTION OF THE DRAWINGS

FIG. 26 is a view showing the relationship between the measured positions and the flow rate in the sixth embodiment and a comparative example;

FIG. 27 is a view showing the relationship between the measured positions and the temperature in the sixth embodiment and the comparative example; and FIG. 28 is a cross sectional view showing part of a conventional fuel cell.

DESCRIPTION OF THE PREFERRED EMBODIMENTS

Figure 1:
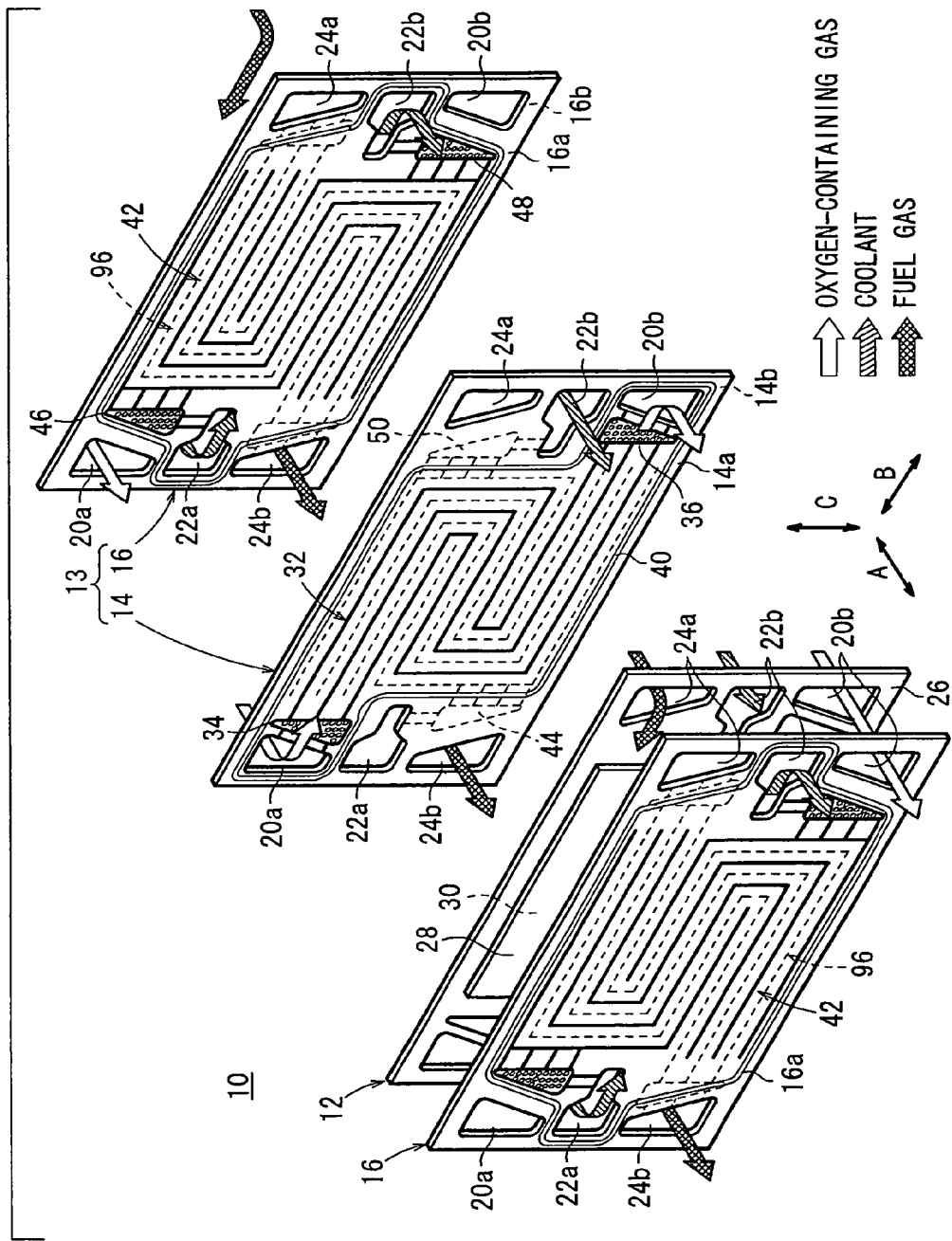
FIG. 1 is an exploded perspective view showing main components of a fuel cell according to a first embodiment of the present invention.
Figure 2:
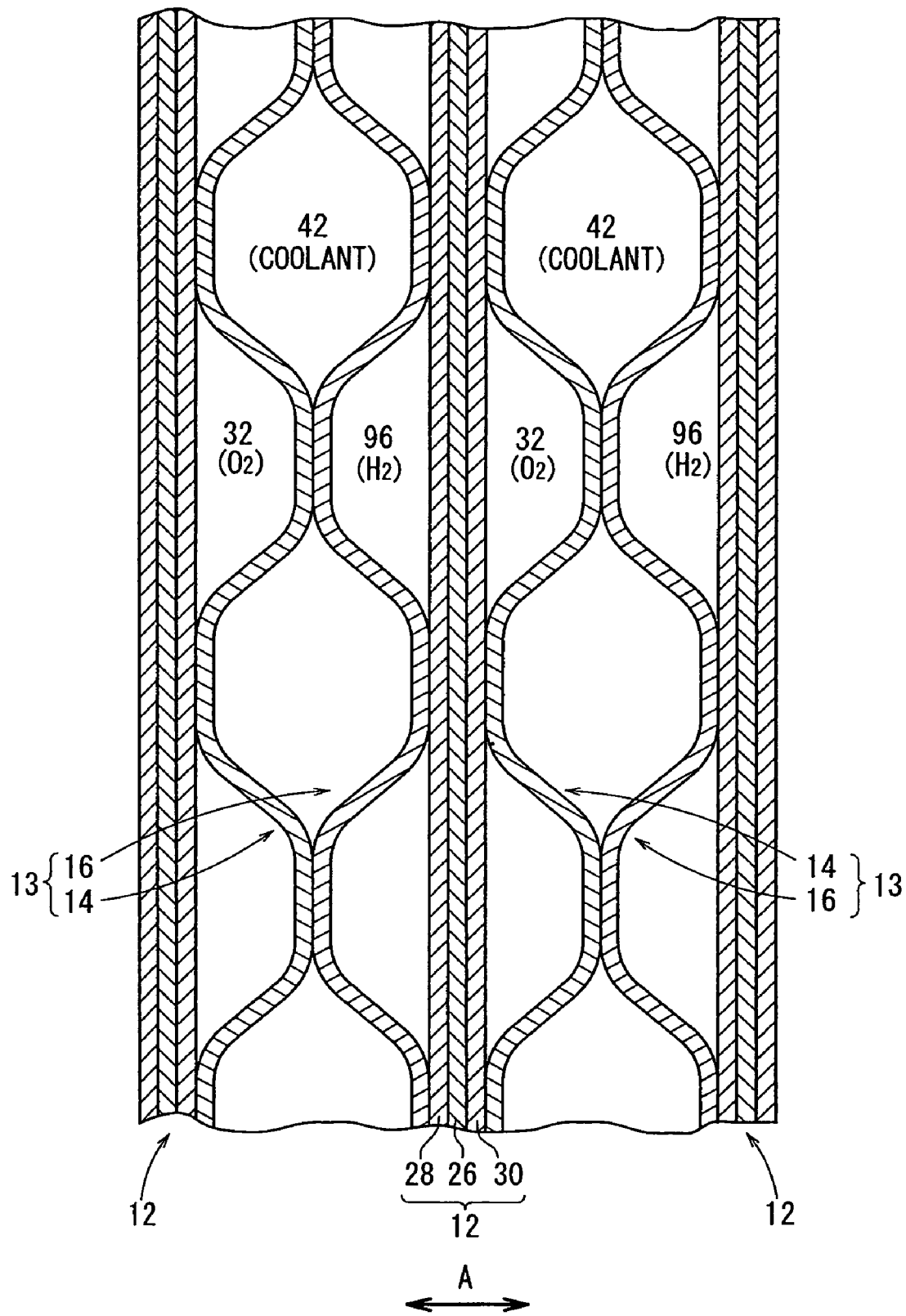
FIG. 2 is a cross sectional view showing part of the fuel cell.

FIG. 1 is an exploded perspective view showing main components of a fuel cell 10 according to a first embodiment of the present invention. FIG. 2 is a cross sectional view showing part of the fuel cell 10.

The fuel cell 10 is formed by stacking a membrane electrode assembly 12 and separators 13 alternately in a horizontal direction. Each of the separators 13 includes first and second horizontally long rectangular metal plates 14, 16 which are stacked together.

As shown in FIG. 1, at one end of the fuel cell 10 in a direction indicated by an arrow B, an oxygen-containing gas supply passage 20a for supplying an oxidizing gas such as an oxygen-containing gas, a coolant supply passage 22a for supplying a coolant, and a fuel gas discharge passage 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in the stacking direction (horizontal direction) indicated by an arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged vertically in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example.

Each of the anode 28 and the cathode 30 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

Figure 3:
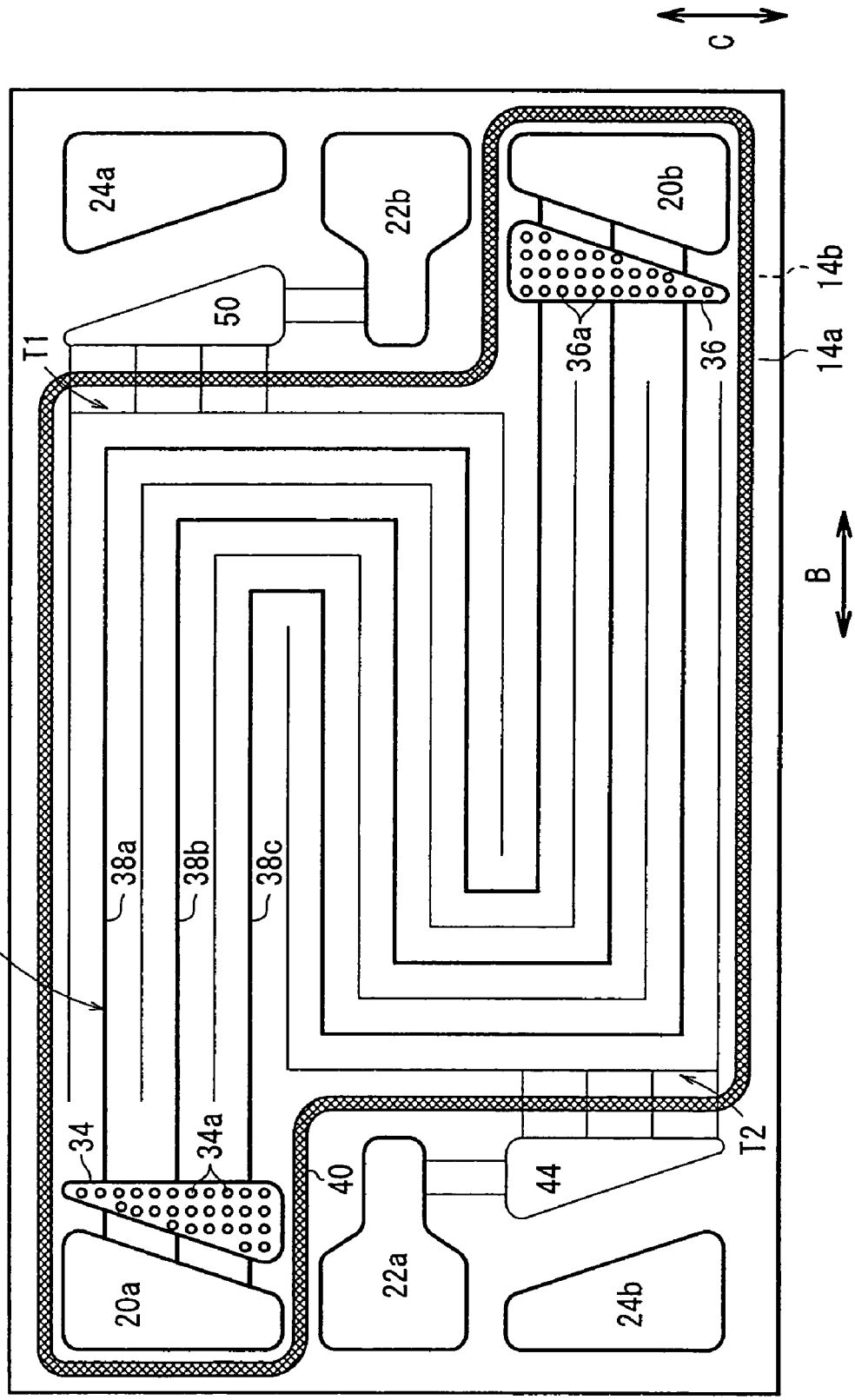
FIG. 3 is a front view showing one surface of a first metal plate.

As shown in FIGS. 1 and 3, the first metal plate 14 has an oxygen-containing gas flow field 32 on its surface 14a facing the membrane electrode assembly 12. The oxygen-containing gas flow field 32 is connected to the oxygen-containing gas supply passage 20a and the oxygen-containing gas discharge passage 20b. The oxygen-containing gas flow field 32 includes an inlet buffer 34 near the oxygen-containing gas supply passage 20a, and an outlet buffer 36 near the oxygen-containing gas discharge passage 20b. A plurality of bosses 34a, 36a are formed in the inlet buffer 34 and the outlet buffer 36, respectively.

The inlet buffer 34 and the outlet buffer 36 are connected by three oxygen-containing gas flow grooves 38a, 38b, 38c. The oxygen-containing gas flow grooves 38a through 38c extend in parallel with each other in a serpentine pattern for allowing the oxygen-containing gas to flow back and forth in the direction indicated by the arrow B, and flows in the direction indicated by the arrow C. Specifically, the oxygen-containing gas flow grooves 38a through 38c have two turn regions T1, T2, and three straight regions extending in the direction indicated by the arrow B, for example.

A line seal 40 is provided on the surface 14a of the first metal plate 14 around the oxygen-containing gas supply passage 20a, the oxygen-containing gas discharge passage 20b, and the oxygen-containing gas flow field 32 for preventing leakage of the oxygen-containing gas.

Figure 4:
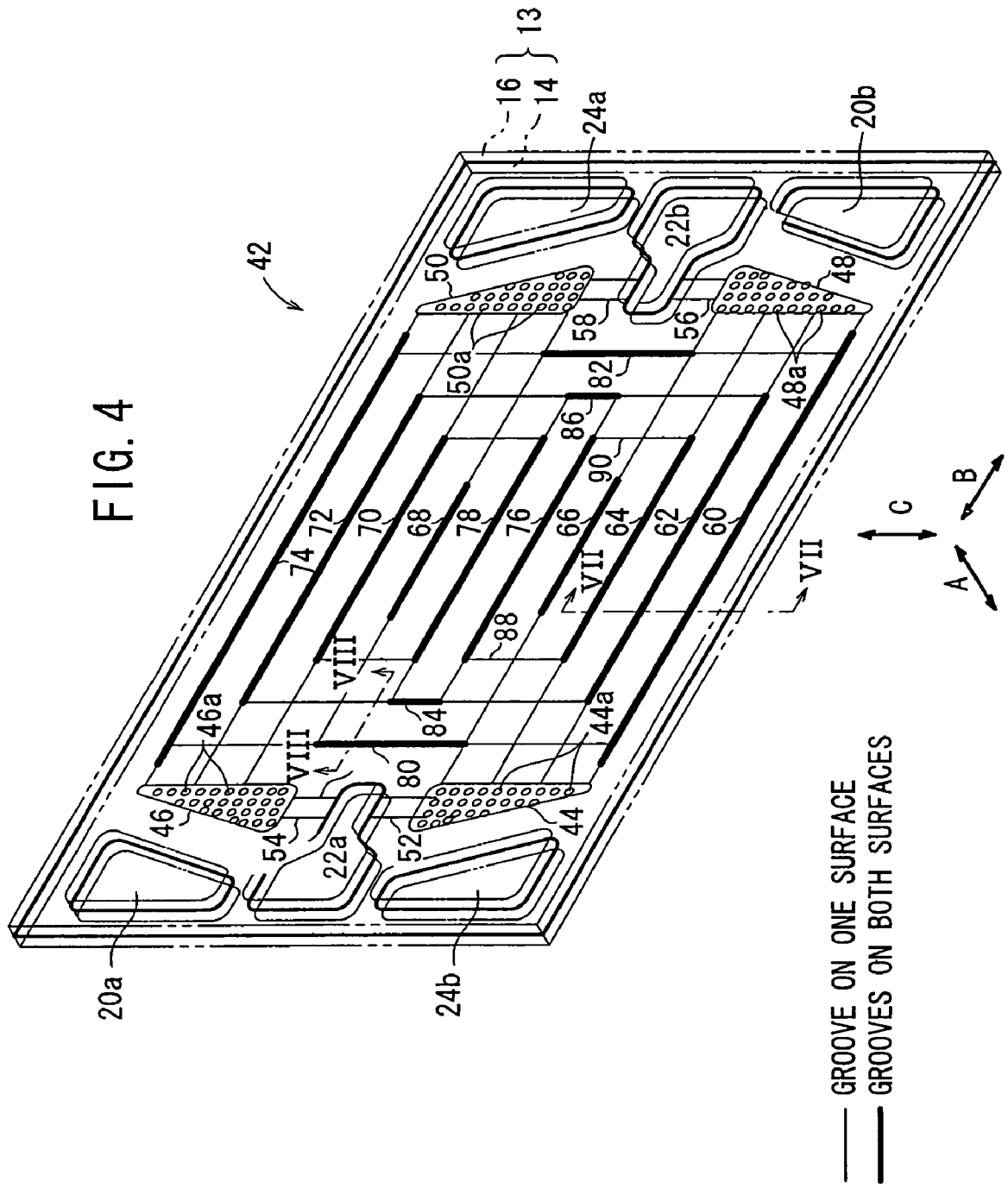
FIG. 4 is a perspective view showing a coolant flow field formed in a separator.

A surface 14b of the first metal plate 14 faces a surface 16a of the second metal plate 16, and a coolant flow field 42 is formed between the surface 14b of the first metal plate 14 and the surface 16a of the second metal plate 16. As shown in FIG. 4, the coolant flow field 42 includes, e.g., two inlet buffers 44, 46 near the coolant supply passage 22a, and includes, e.g., two outlet buffers 48, 50 near the coolant discharge passage 22b. The inlet buffers 44, 46 are provided at opposite sides of the coolant supply passage 22a in the direction indicated by the arrow C, and the outlet buffers 48, 50 are provided at opposite sides of the coolant discharge passage 22b in the direction indicated by the arrow C. A plurality of bosses 44a, 46a, 48a, and 50a are formed in the inlet buffers 44, 46 and the outlet buffers 48, 50, respectively.

The coolant supply passage 22a and the inlet buffers 44, 46 are connected by two inlet flow grooves 52, 54, respectively, and the coolant discharge passage 22b and the outlet buffers 48, 50 are connected by two outlet flow grooves 56, 58, respectively.

The inlet buffer 44 and the outlet buffer 48 are connected by straight flow grooves 60, 62, 64, and 66 extending in the direction indicated by the arrow B. The inlet buffer 46 and the outlet buffer 50 are connected by straight flow grooves 68, 70, 72, and 74 extending in the direction indicated by the arrow B. Straight flow grooves 76, 78 extending in the direction indicated by the arrow B for a predetermined distance are provided between the straight flow groove 66 and the straight flow groove 68.

The straight flow grooves 60 through 74 are connected by straight flow grooves 80, 82 which are extending in the direction indicated by the arrow C. The straight flow grooves 62 through 72 are connected with each other by straight flow grooves 84, 86 which are extending discontinuously in the direction indicated by the arrow C. The straight flow grooves 64, 66, and 76 and the straight flow grooves 68, 70, and 78 are connected with each other by straight flow grooves 88, 90 which are extending discontinuously in the direction indicated by the arrow C, respectively.

Figure 5:
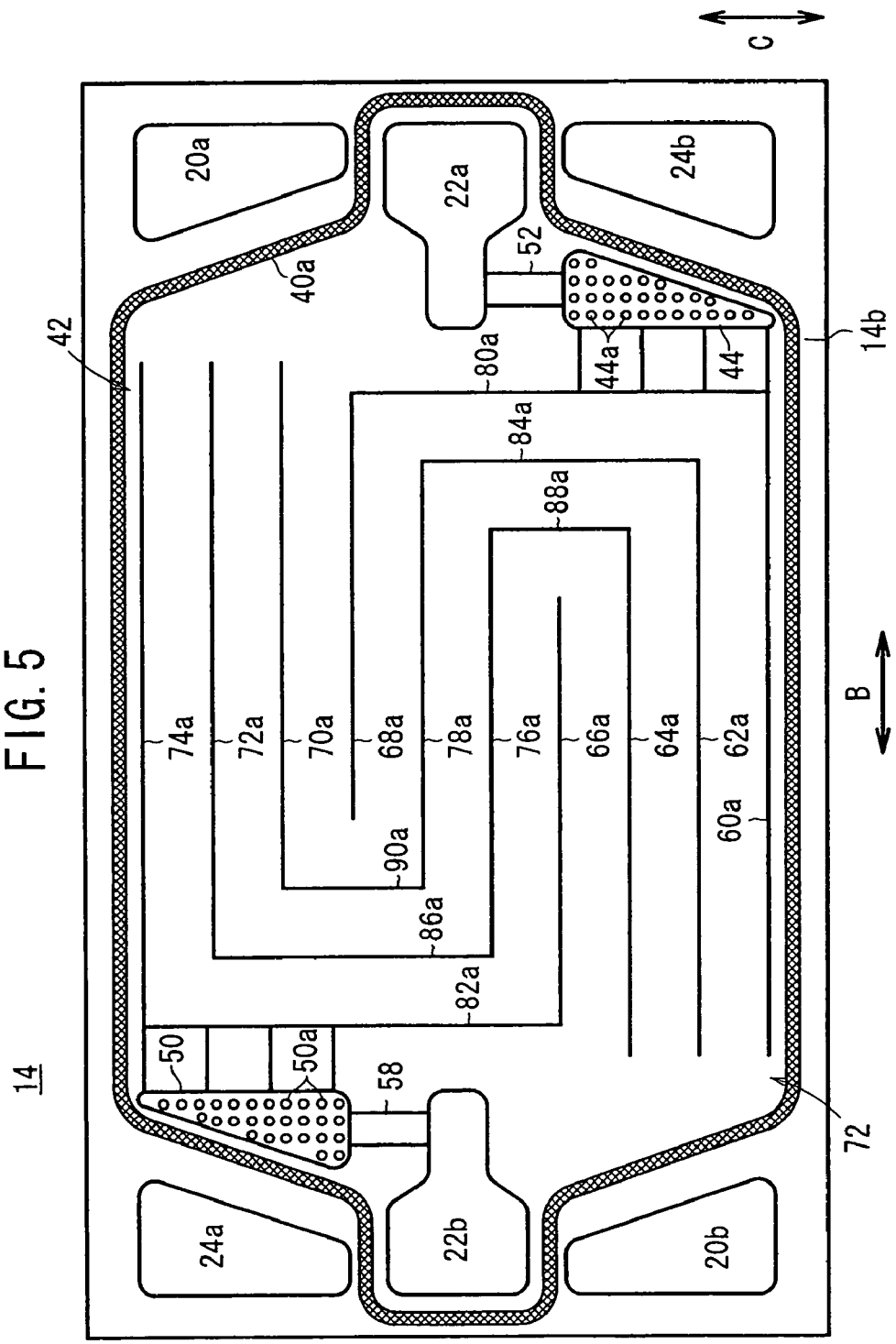
FIG. 5 is a front view showing the other surface of the first metal plate.

The coolant flow field 42 is partially defined by the first metal plate 14, and partially defined by the second metal plate 16. The coolant flow field 42 is formed between the first metal plate 14 and the second metal plate 16 when the first metal plate 14 and the second metal plate 16 are stacked together. As shown in FIG. 5, part of the coolant flow field 42 is formed on the surface 14b where the oxygen-containing gas flow field 32 is not formed on the surface 14a. Protrusions on the surface 14b formed by the grooves of the oxygen-containing gas flow field 32 on the surface 14a are not shown for ease of understanding. Likewise, in FIG. 6, protrusions on the surface 16b formed by the grooves of the fuel gas flow field 96 on the surface 16a are not shown.

As shown in FIG. 5, the inlet buffer 44 connected to the coolant supply passage 22a through the two inlet flow grooves 52 is provided on the surface 14b. Further, the outlet buffer 50 connected to the coolant discharge passage 22b through the two outlet connection grooves 58 is provided on the surface 14b.

Grooves 60a, 62a, 64a, and 66a connected to the inlet buffer 44 extend discontinuously in the direction indicated by the arrow B for a predetermined distance. The grooves 60a, 62a, 64a, and 66a are formed where the turn region T2 of the oxygen-containing gas flow grooves 38a through 38c and the outlet buffer 36 is not formed. Grooves 68a, 70a, 72a, and 74a connected to the outlet buffer 50 extend in the direction indicated by the arrow B. The grooves 68a, 70a, 72a, and 74a are formed where the turn region T1 of the oxygen-containing gas flow grooves 38a through 38c and the inlet buffer 34 is not formed.

The grooves 60a through 78a are part of the straight flow grooves 60 through 78, respectively. Grooves 80a through 90a of the straight flow grooves 80 through 90 extend in the direction indicated by the arrow C for a predetermined distance where the serpentine oxygen-containing gas flow grooves 38a through 38c are not formed.

Figure 6:
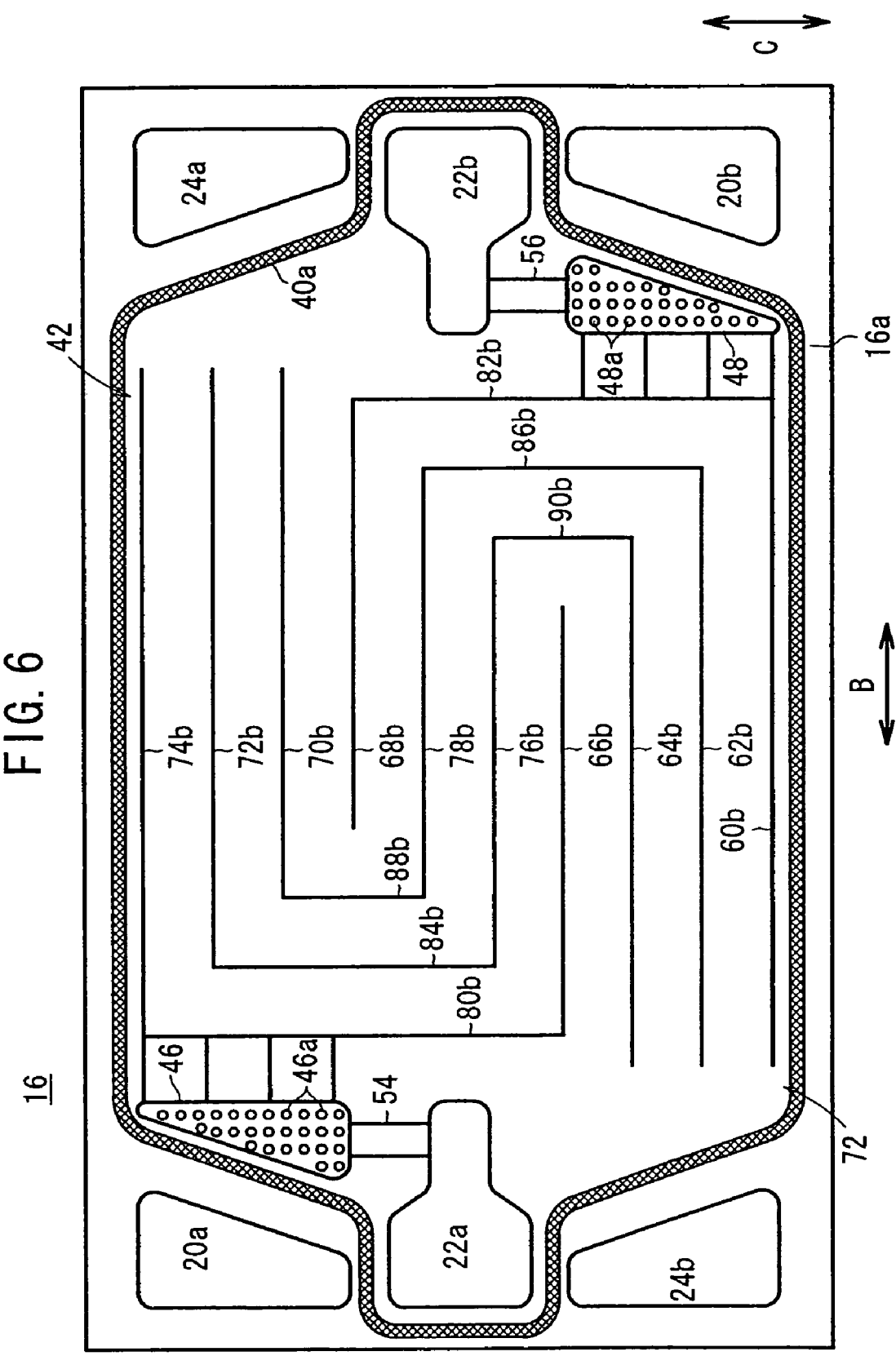
FIG. 6 is a front view showing a second metal plate.

As shown in FIG. 6, part of the coolant flow field 42 is formed on the surface 16a of the second metal plate 16 where the fuel gas flow field 96 as described later is not formed. Specifically, the inlet buffer 46 connected to the coolant supply passage 22a, and the outlet buffer 48 connected to the coolant discharge passage 22b are provided.

Grooves 68b through 74b of the straight flow grooves 68 through 74 connected to the inlet buffer 46 extend discontinuously in the direction indicated by the arrow B for a predetermined distance. Grooves 60b through 66b of the straight flow grooves 60 through 66 connected to the outlet buffer 48 extend in a predetermined pattern. On the surface 16a, grooves 80b through 90b of the straight flow grooves 80 through 90 extend in the direction indicated by the arrow C.

Figure 7:
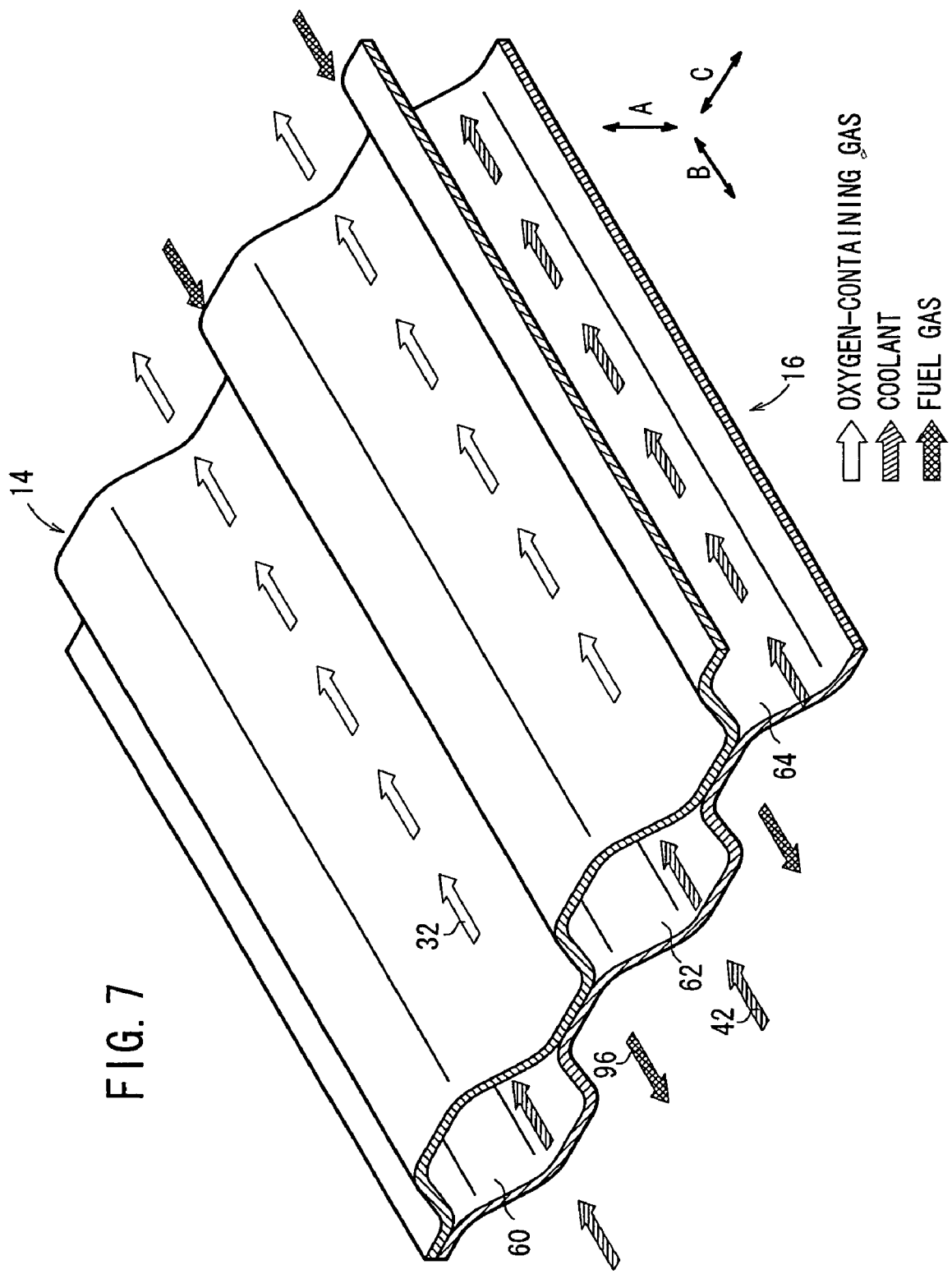
FIG. 7 is a cross sectional view taken along a line VII-VII in FIG. 4.
Figure 8:
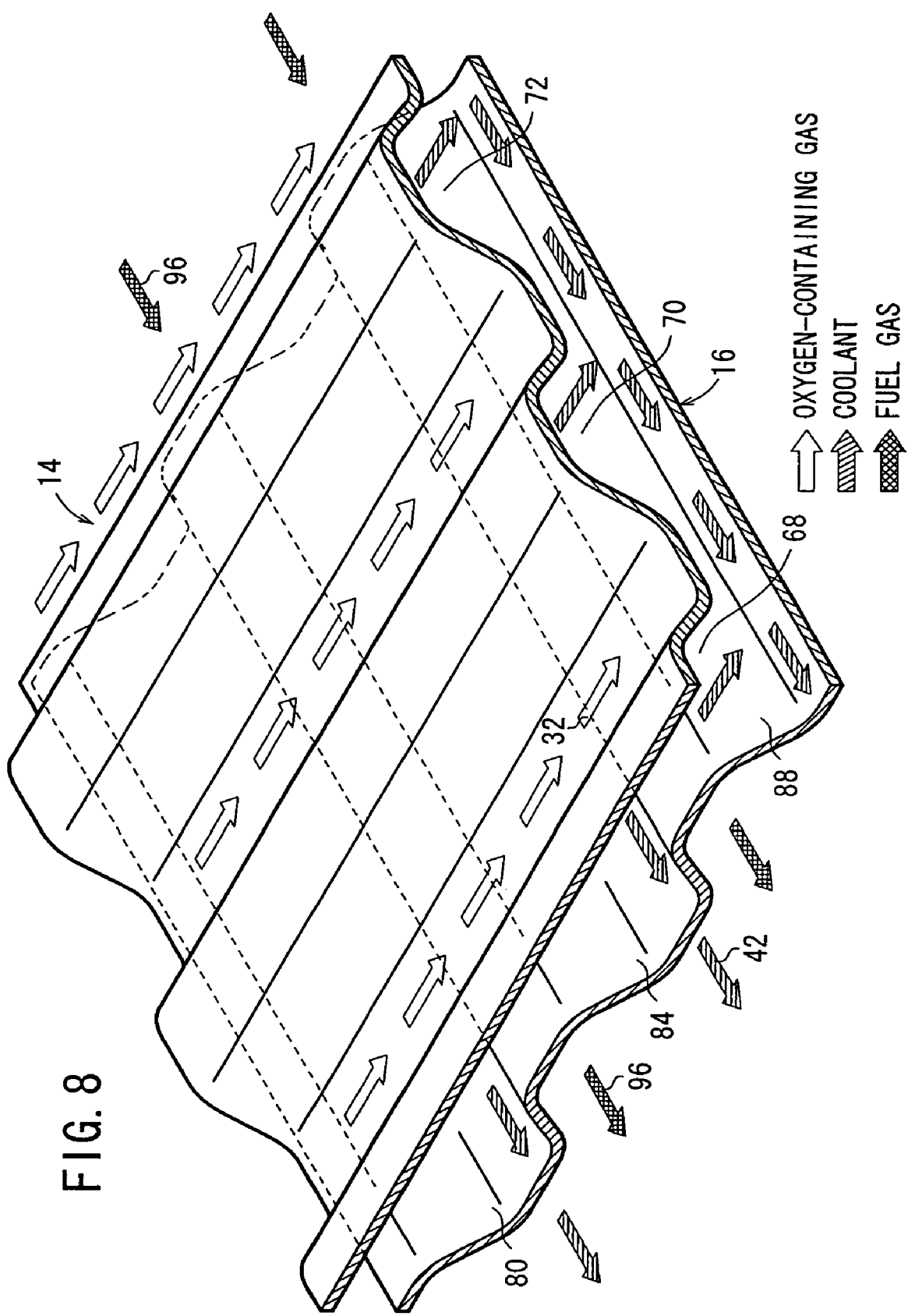
FIG. 8 is a cross sectional view taken along a line VIII-VIII in FIG. 4.

In the coolant flow field 42, at part of the straight flow grooves 60 through 78 extending in the direction indicated by the arrow B, the grooves 60a through 78a and the grooves 60b through 78b face each other to form a main flow field. The sectional area of the main flow field in the coolant flow field 42 is twice as large as the sectional area of the other part of the coolant flow field 42 (see FIGS. 4 and 7). The straight flow grooves 80 through 94 are partially defined by grooves on both surfaces 14b, 16a of the first and second metal plate 14, 16, partially defined on one surface 14b of the first metal plate 14, and partially defined on one surface 16a of the second metal plate 16 (see FIG. 8). A line seal 40a is formed between the surface 14a of the first metal plate 14 and the surface 16a of the second metal plate 16.

Figure 9:
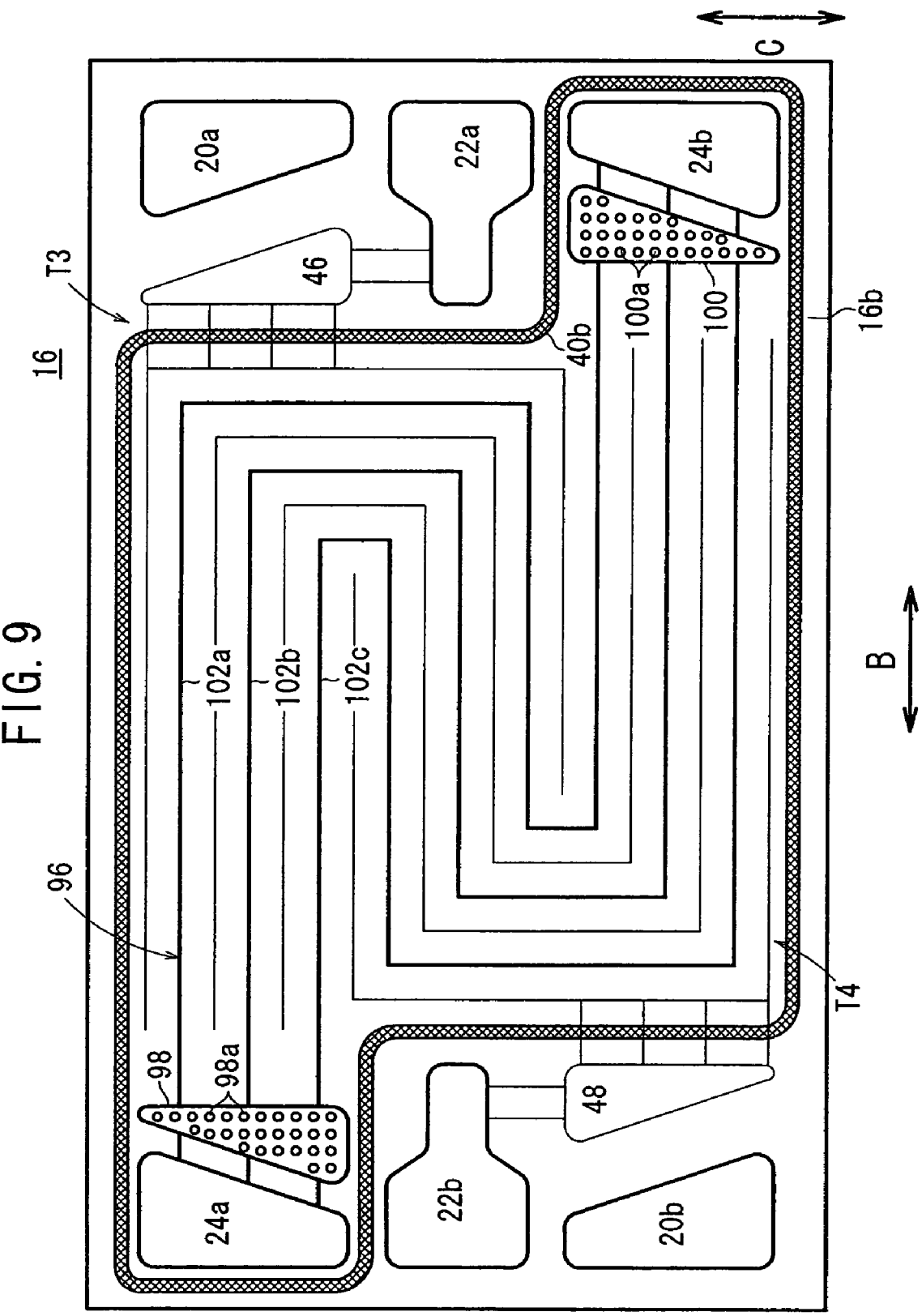
FIG. 9 is a front view showing the other surface of the second metal plate.

As shown in FIG. 9, the second metal plate 16 has the fuel gas flow field 96 on its surface 16b facing the membrane electrode assembly 12. The fuel gas flow field 96 includes an inlet buffer 98 provided near the fuel gas supply passage 24a, and an outlet buffer 100 provided near the fuel gas discharge passage 24b.

A plurality of bosses 98a, 100a are formed in the inlet buffer 98 and the outlet buffer 100, respectively. For example, the inlet buffer 98 and the outlet buffer 100 are connected by three fuel gas flow grooves 102a, 102b, 102c. The fuel gas flow grooves 102a through 102c extend in a serpentine pattern for allowing the fuel gas to flow back and forth in the direction indicated by the arrow B, and flows in the direction indicated by the arrow C. The fuel gas flow grooves 102a through 102c are substantially serpentine flow grooves having two turn regions T3, T4, and three straight regions, for example. On the surface 16b, a line seal 40b is provided around the fuel gas flow field 96.

Next, operation of the fuel cell 10 according to the first embodiment will be described.

As shown in FIG. 1, an oxidizing gas such as an oxygen-containing gas is supplied to the oxygen-containing gas supply passage 20a, a fuel gas such as a hydrogen-containing gas is supplied to the fuel gas supply passage 24a, and a coolant such as pure water, an ethylene glycol or an oil is supplied to the coolant supply passage 22a.

The oxygen-containing gas flows from the oxygen-containing gas supply passage 20a into the oxygen-containing gas flow field 32 of the first metal plate 14. As shown in FIG. 3, the oxygen-containing gas flows through the inlet buffer 34, and is distributed into the oxygen-containing gas flow grooves 38a through 38c. The oxygen-containing gas flows through the oxygen-containing gas flow grooves 38a through 38c in a serpentine pattern along the cathode 30 of the membrane electrode assembly 12.

The fuel gas flows from the fuel gas supply passage 24a into the fuel gas flow field 96 of the second metal plate 16. As shown in FIG. 9, the fuel gas flows through the inlet buffer 98, and is distributed into the fuel gas flow grooves 102a through 102c. The fuel gas flows through the fuel gas flow grooves 102a through 102c in a serpentine pattern along the anode 28 of the membrane electrode assembly 12.

In the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 36. Likewise, after the fuel gas is consumed at the anode 28, the fuel gas flows into the fuel gas discharge passage 24b through the outlet buffer 100.

The coolant supplied to the coolant supply passages 22a flows into the coolant flow field 42 between the first and second metal plates 14, 16. As shown in FIG. 4, the coolant from the coolant supply passage 22a flows through the inlet flow grooves 52, 54 in the direction indicated by the arrow C, and flows into the inlet buffers 44, 46.

The coolant is distributed from the inlet buffers 44, 46 into the straight flow grooves 60 through 66, and 68 through 74, and flows horizontally in the direction indicated by the arrow B. The coolant also flows through the straight flow grooves 80 through 90, 76, and 78. Thus, the coolant is supplied to the entire power generation surface of the membrane electrode assembly 12. Then, the coolant flows through the outlet buffers 48, 50, and flows into the coolant discharge passages 22b through the outlet flow grooves 56, 58.

In the first embodiment, the coolant flow field 42 between the first and second metal plates 14, 16 includes the two inlet buffers 44, 46 connected to the coolant supply passage 22a and the two outlet buffers 48, 50 connected to the coolant discharge passage 22b. Therefore, the coolant flows separately from the coolant supply passage 22a in the direction indicated by the arrow C, and flows into the inlet buffers 44, 46. Then, the coolant flows through the straight flow grooves 60 through 90 along the power generation surface, flows into the outlet buffers 48, 50, and is discharged into the coolant discharge passage 22b.

Therefore, the coolant flows along the entire surface of the separator 13 uniformly, and cools the power generation surface of the membrane electrode assembly 12 uniformly. Thus, the overall power generation performance of the fuel cell 10 is stable.

In the first metal plate 14, part of the coolant flow field 42 is formed where the oxygen-containing gas flow field 32 is not formed on the surface 14a (the oxygen-containing gas flow field 32 is fabricated by pressure forming). Specifically, as shown in FIG. 3, the inlet buffer 44 is formed at a position below the coolant supply passage 22a where the inlet buffer 34 is not formed, and the outlet buffer 50 is formed at a position above the coolant discharge passage 22b where the outlet buffer 36 is not formed. Further, the grooves 60a through 90a each having a predetermined shape are formed where the serpentine oxygen-containing gas flow grooves 38a through 38c are not formed (see FIGS. 3 and 5). Thus, the oxygen-containing gas flow field 32 and the coolant flow field 42 are formed on both surfaces 14a, 14b of the first metal plate 14, respectively.

Further, part of the coolant flow field 42 is formed on the surface 16a of the second metal plate 16 where the fuel gas flow field 96 on the surface 16b is not formed. Specifically, as shown in FIG. 9, the inlet buffer 46 is formed at a position above the coolant supply passage 22a where the outlet buffer 100 is not formed. Further, the outlet buffer 48 is formed at a position below the coolant discharge passage 22b where the inlet buffer 98 is not formed. Further, the grooves 60b through 90b each having a predetermined shape are formed where the serpentine oxygen fuel gas flow grooves 102a through 102c are not formed (see FIGS. 6 and 9). Thus, the fuel gas flow field 96 and the coolant flow field 42 are formed on both surfaces 16a, 16b of the second metal plate 16, respectively.

In this manner, even though the shape of the coolant flow field 42 on the first metal plate 14 is constrained by the oxygen-containing gas flow field 32, and the shape of the coolant flow field 42 on the second metal plate 16 is constrained by the fuel gas flow field 96, the coolant flow field 42 on the first metal plate 14 and the coolant flow field 42 on the second metal plate 16 compensate with each other. Therefore, with the simple structure, the coolant flow field 42 having the desired shape is reliably formed in the separator 13.

Figure 10:
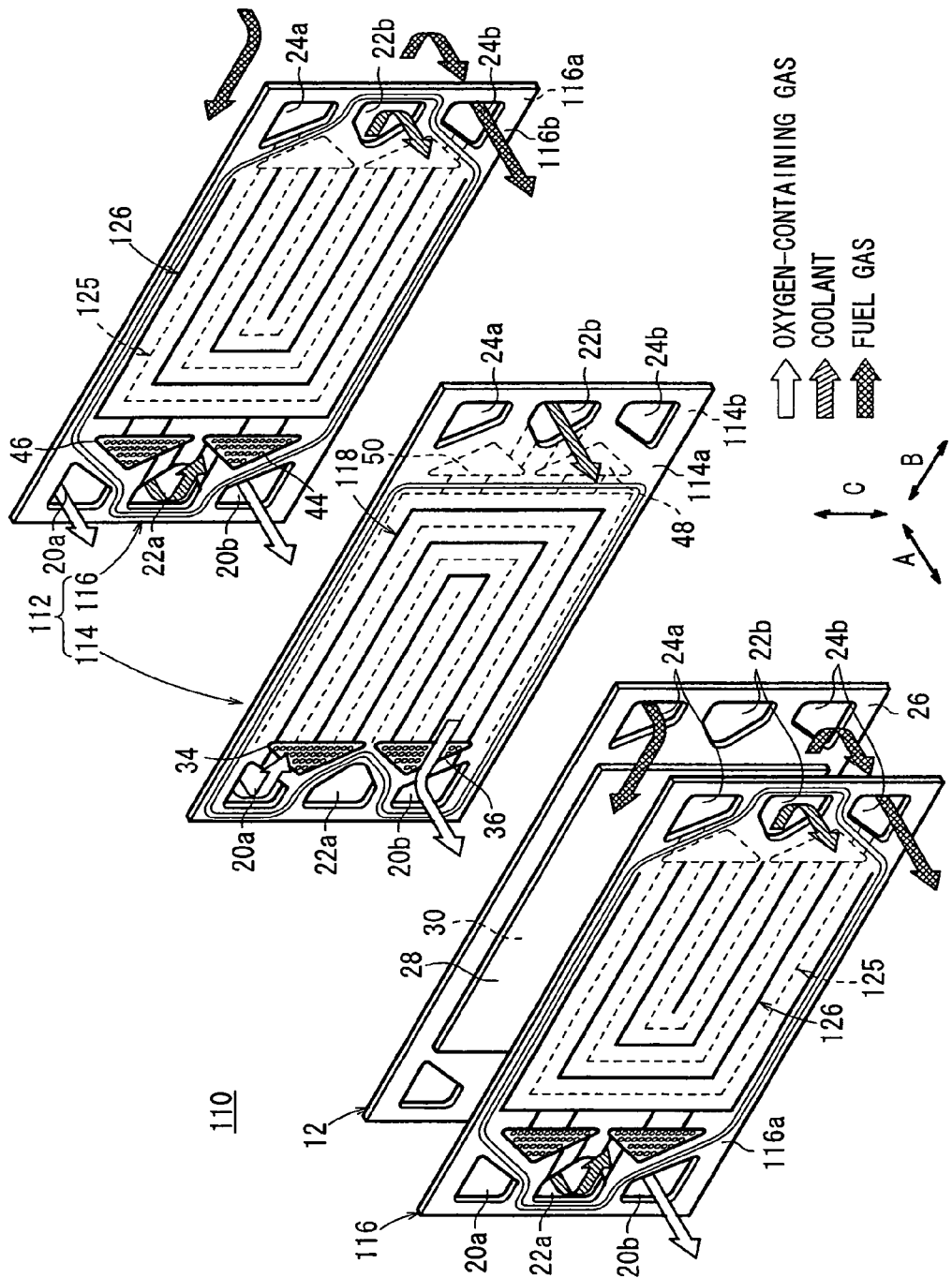
FIG. 10 is an exploded perspective view showing main components of a fuel cell according to a second embodiment of the present invention.

FIG. 10 is an exploded perspective view showing a fuel cell 110 according to a second embodiment of the present invention. In FIG. 10, the constituent elements that are identical to those of the first embodiment are labeled with the same reference numeral, and description thereof will be omitted. Likewise, in third through sixth embodiments as described later, the constituent elements that are identical to those of the first embodiment are labeled with the same reference numeral, and description thereof will be omitted.

The fuel cell 110 is formed by stacking the membrane electrode assembly 12 and separators 112 alternately. Each of the separators 112 includes first and second metal plates 114, 116, which are stacked together. At one end of the fuel cell 110 in the direction indicated by an arrow B, an oxygen-containing gas supply passage 20a, a coolant supply passage 22a, and an oxygen-containing gas discharge passage 20b are formed. At the other end of the fuel cell 110 in the direction indicated by the arrow B, a fuel gas supply passage 24a, a coolant discharge passage 22b, and a fuel gas discharge passage 24b are formed.

Figure 11:
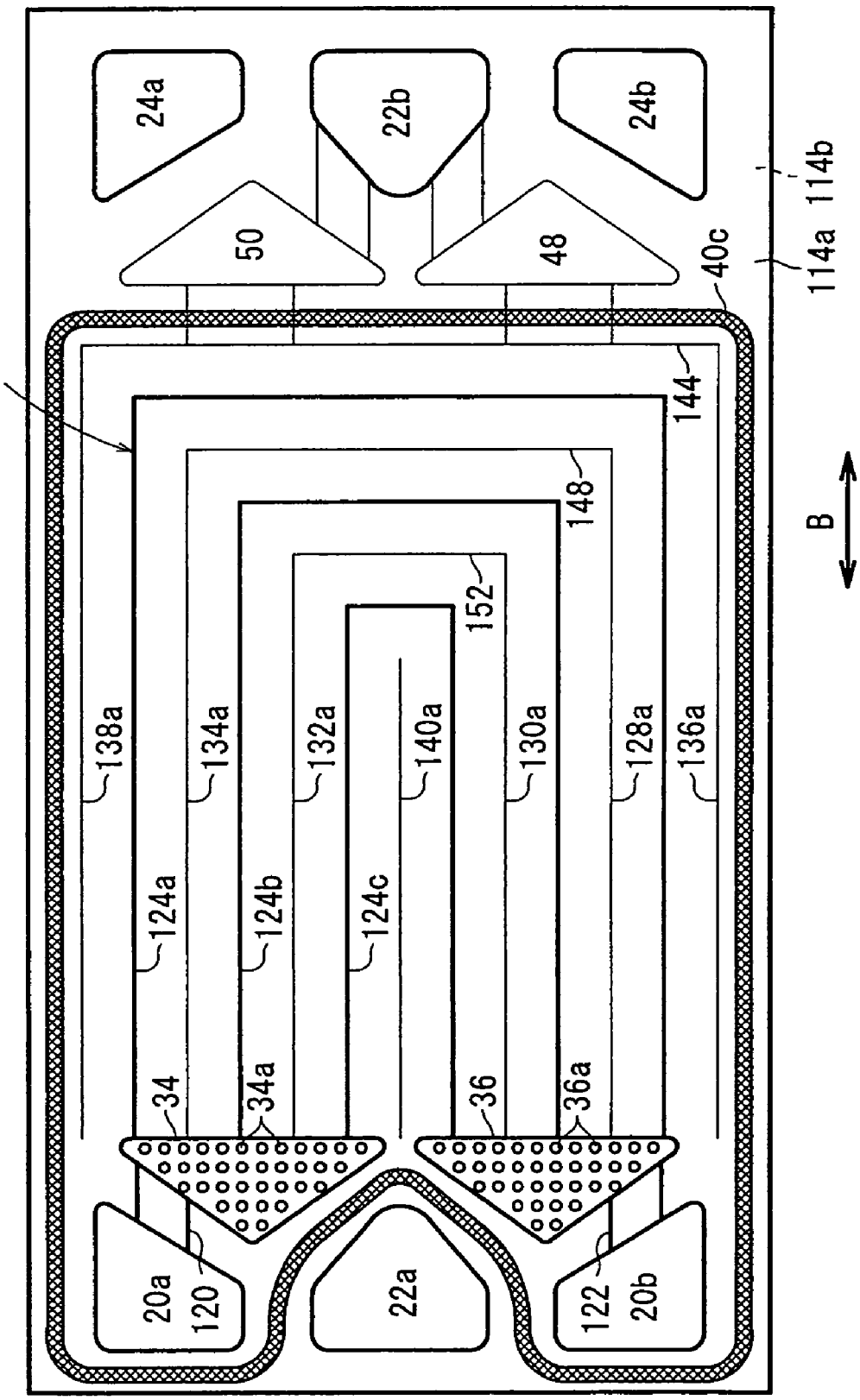
FIG. 11 is a front view showing a first metal plate of the fuel cell.

As shown in FIG. 11, the first metal plate 114 has an oxygen-containing gas flow field 118 on its surface 114a facing a cathode 30 of the first metal plate 114. The oxygen-containing gas flow field 118 includes an inlet buffer 34 connected to the oxygen-containing gas supply passage 20a through two inlet flow grooves 120 and an outlet buffer 36 connected to the oxygen-containing gas discharge passage 20b through two outlet flow grooves 122. The inlet buffer 34 and the outlet buffer 36 are adjacent to each other. The inlet buffer 34 and the outlet buffer 36 are connected through oxygen-containing gas flow grooves 124a, 124b, 124c each curved in a substantially U-shape.

A coolant flow field 126 is formed between the first and second metal plates 114, 116. The second metal plate 116 has a fuel gas flow field 125 on its surface 116a facing an anode 28.

Figure 12:
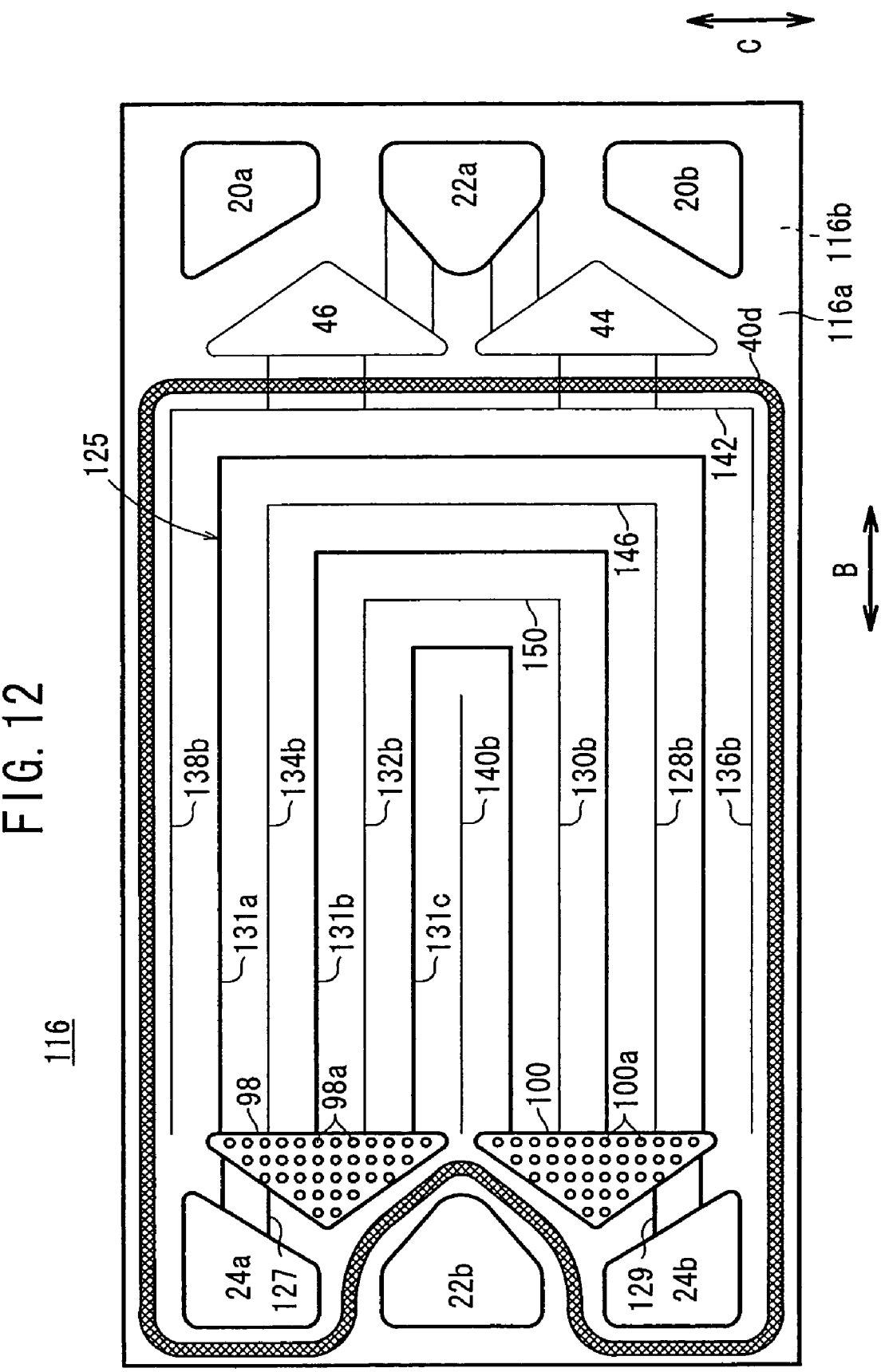
FIG. 12 is a front view showing a second metal plate of the fuel cell.

As shown in FIG. 12, the fuel gas flow field 125 includes an inlet buffer 98 connected to the fuel gas supply passage 24a through two inlet flow grooves 127 and an outlet buffer 100 connected to the fuel gas discharge passage 24b through two outlet flow grooves 129. The inlet buffer 98 and the outlet buffer 100 are adjacent to each other. The inlet buffer 98 and the outlet buffer 100 are connected through fuel gas flow grooves 131a, 131b, 131c each curved in a substantially U-shape.

Figure 13:
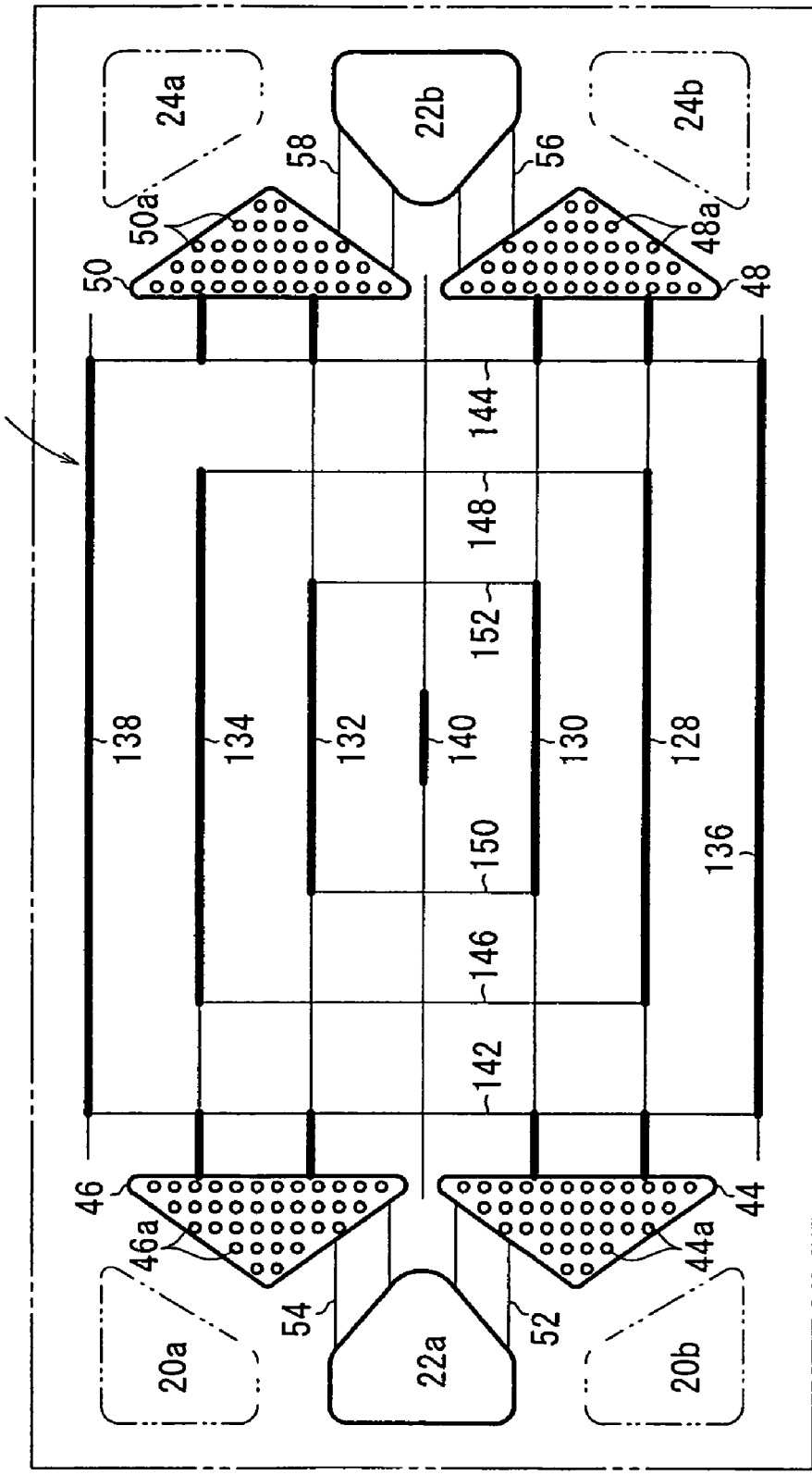
FIG. 13 is a front view showing a coolant flow field formed in a separator of the fuel cell.

As shown in FIG. 13, the coolant flow field 126 includes inlet buffers 44, 46 near the coolant supply passage 22a, and outlet buffers 48, 50 near the coolant discharge passage 22b. The inlet buffer 44 and the outlet buffer are connected by straight flow grooves 128, 130 extending in the direction indicated by the arrow B. Likewise, the inlet buffer 46 and the outlet buffer 50 are connected by straight flow grooves 132, 134 extending in the direction indicated by the arrow B.

Straight flow grooves 136, 138 are formed outside the straight flow grooves 128, 134 in the direction indicated by the arrow C. Further, a straight flow groove 140 is formed between the straight flow grooves 130, 132.

The straight flow grooves 128 through 140 are connected by straight flow grooves 142, 144 extending in the direction indicated by the arrow C. The straight flow grooves 128 through 134, and 140 are connected by straight flow grooves 146, 148 extending in the direction indicated by the arrow C. The straight flow grooves 130, 132, and 140 are connected by straight flow grooves 150, 152 extending in the direction indicated by the arrow C.

As shown in FIG. 11, the first metal plate 114 has outlet buffers 48, 50 connected to the coolant discharge passage 22b on its surface 114b facing the second metal plate 116. On the surface 114b, grooves 128a through 140a of the straight flow grooves 128 through 140 are formed where curved portions of the oxygen-containing containing gas flow grooves 124a through 124c of the oxygen-containing gas flow field 118 are not formed. On the surface 114b, straight flow grooves 146, 148 and 152 are formed in the direction indicated by the arrow C.

As shown in FIG. 12, the second metal plate 116 has inlet buffers 44, 46 near the coolant supply passage 22a on its surface 116b facing the first metal plate 114. On the surface 116b, grooves 128b through 140b of the straight flow grooves 128 through 140 are formed where curved portions of the fuel gas flow grooves 131a through 131c are not formed. On the surface 116b, straight flow grooves 142, 146 and 150 are formed in the direction indicated by the arrow C. Line seals 40c, 40d are formed on the surfaces 114a, 116a, and unillustrated line seals are formed between the surfaces 114b, 116b.

In the second embodiment, the first metal plate 114 has an oxygen-containing gas flow field 118 on the surface 114a. In the oxygen-containing gas flow field 118, the inlet buffer 34 and the outlet buffer 36 are connected through the oxygen-containing gas flow grooves 124a through 124c each curved in a substantially U-shape. The second metal plate 116 has the fuel gas flow field 125 on the surface 116a. In the fuel gas flow field 125, the inlet buffer 98 and the outlet buffer 100 are connected by the fuel gas flow grooves 131a through 131c each curved in a substantially U-shape.

In this manner, even though the shape of the grooves for the coolant on the surface 114b of the first metal plate 114 and the shape of the grooves for the coolant on the surface 116b of the second metal plate 116 are constrained, the coolant flow field 126 is formed between the first metal plate 114 and the second metal plate 116 such that the grooves on the first metal plate 114 and the grooves on the second metal plate 116 compensate with each other.

In the coolant flow field 126, the two inlet buffers 44, 46 connected to the coolant supply passage 22a, and the outlet buffers 48, 50 connected to the coolant discharge passage 22b are formed. Therefore, the coolant flows along the surface of the separator 112 uniformly. Thus, the same advantages as with the first embodiment can be obtained. For example, it is possible to uniformly cool the electrode surface of the membrane electrode assembly 12 to obtain the stable performance of the fuel cell.

Figure 14:
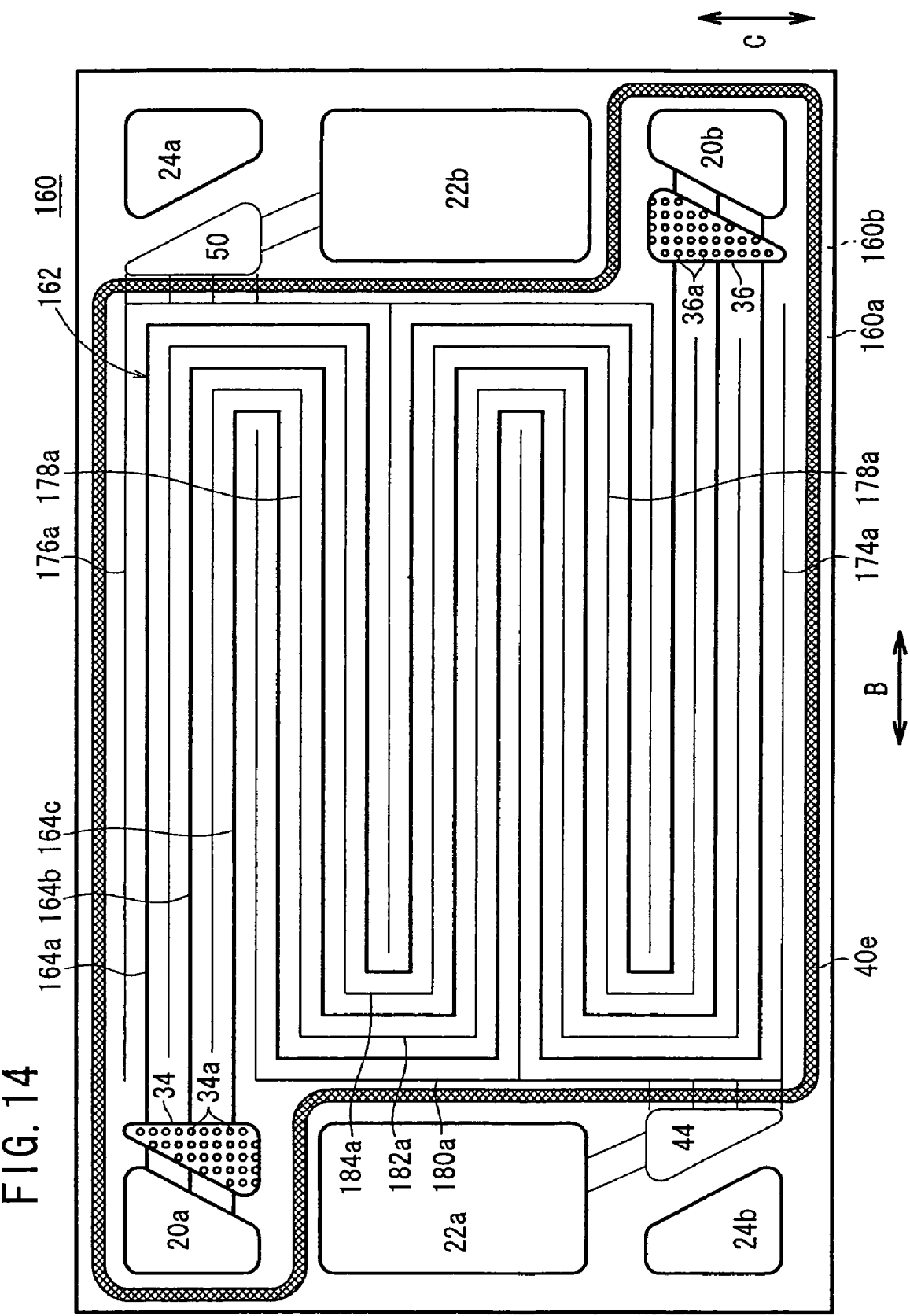
FIG. 14 is a front view showing a first metal plate of a fuel cell according to a third embodiment of the present invention.

FIG. 14 is a front view showing a first metal plate 160 of a fuel cell according to a third embodiment of the present invention. The first metal plate 160 has an oxygen-containing gas flow field 162 on its surface 160a facing the cathode 30. The oxygen-containing gas flow field 162 is connected to the oxygen-containing gas supply passage 20a and the oxygen-containing gas discharge passage 20b. The oxygen-containing gas flow field 162 includes three oxygen-containing gas flow grooves 164a through 164c connected between the inlet buffer 34 and the outlet buffer 36. The oxygen-containing gas flow grooves 164a through 164c extend in a serpentine pattern for allowing the oxygen-containing gas to flow back and forth in the direction indicated by the arrow B, and flow in the direction indicated by the arrow C. Each of the oxygen-containing gas flow grooves 164a through 164c have four turn regions and five straight regions extending in the direction indicated by the arrow B.

Figure 15:
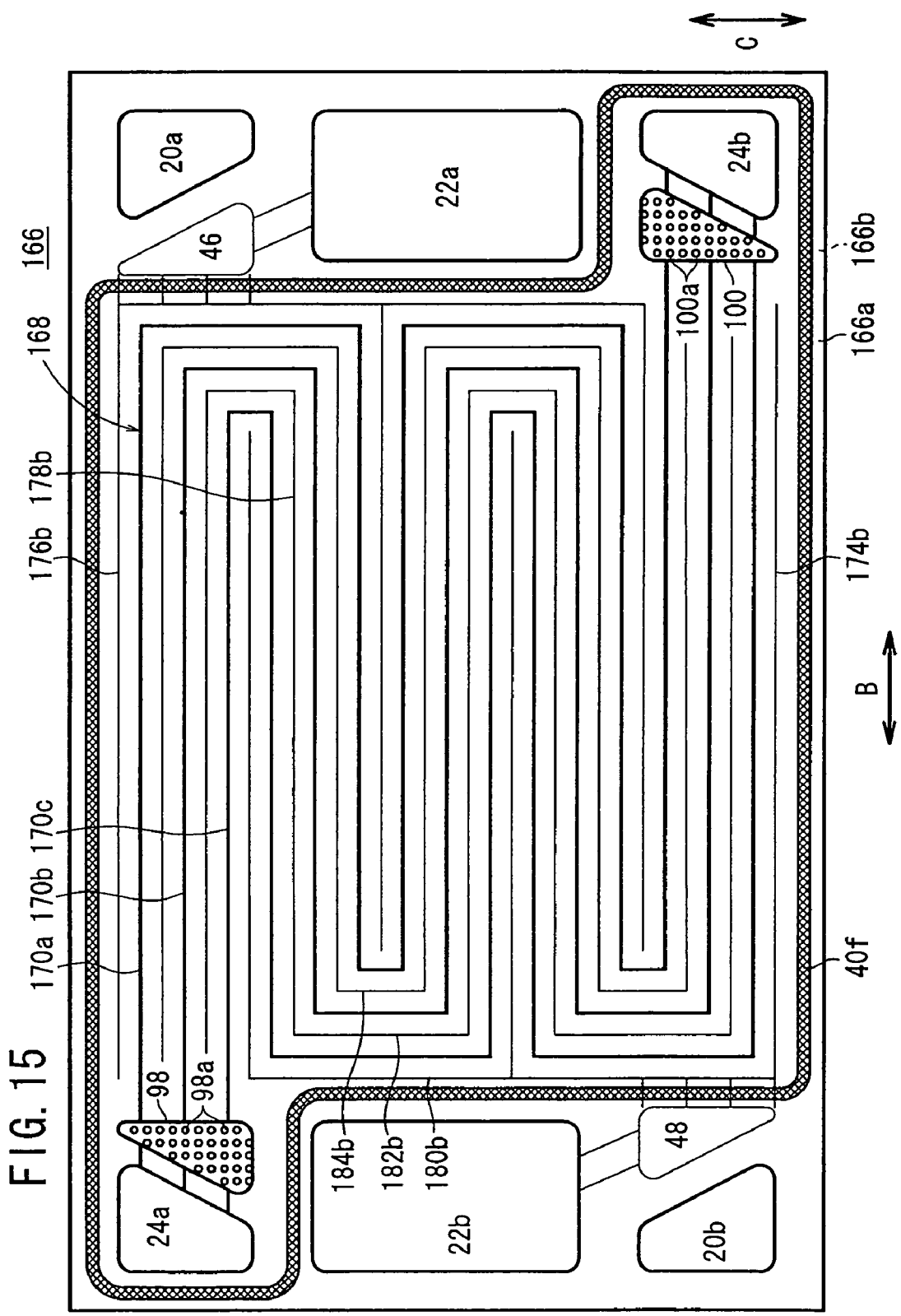
FIG. 15 is a front view showing a second metal plate of the fuel cell.

FIG. 15 is a front view showing a second surface 166a of a second metal plate 166 facing the anode 28. The second metal plate 166 is stacked on the first metal plate 160.

A fuel gas flow field 168 is formed on the surface 166a. The fuel gas flow field 168 is connected between the fuel gas supply passage 24a and the fuel gas discharge passage 24b. The fuel gas flow field 168 includes three fuel gas flow grooves 170a through 170c connected between the inlet buffer 98 and the outlet buffer 100. The fuel gas flow grooves 170a through 170c extend in a serpentine pattern for allowing the fuel gas to flow back and forth in the direction indicated by the arrow B, and flow in the direction indicated by the arrow C. Each of the fuel gas flow grooves 170a through 170c have four turn regions and five straight regions extending in the direction indicated by the arrow B.

Figure 16:
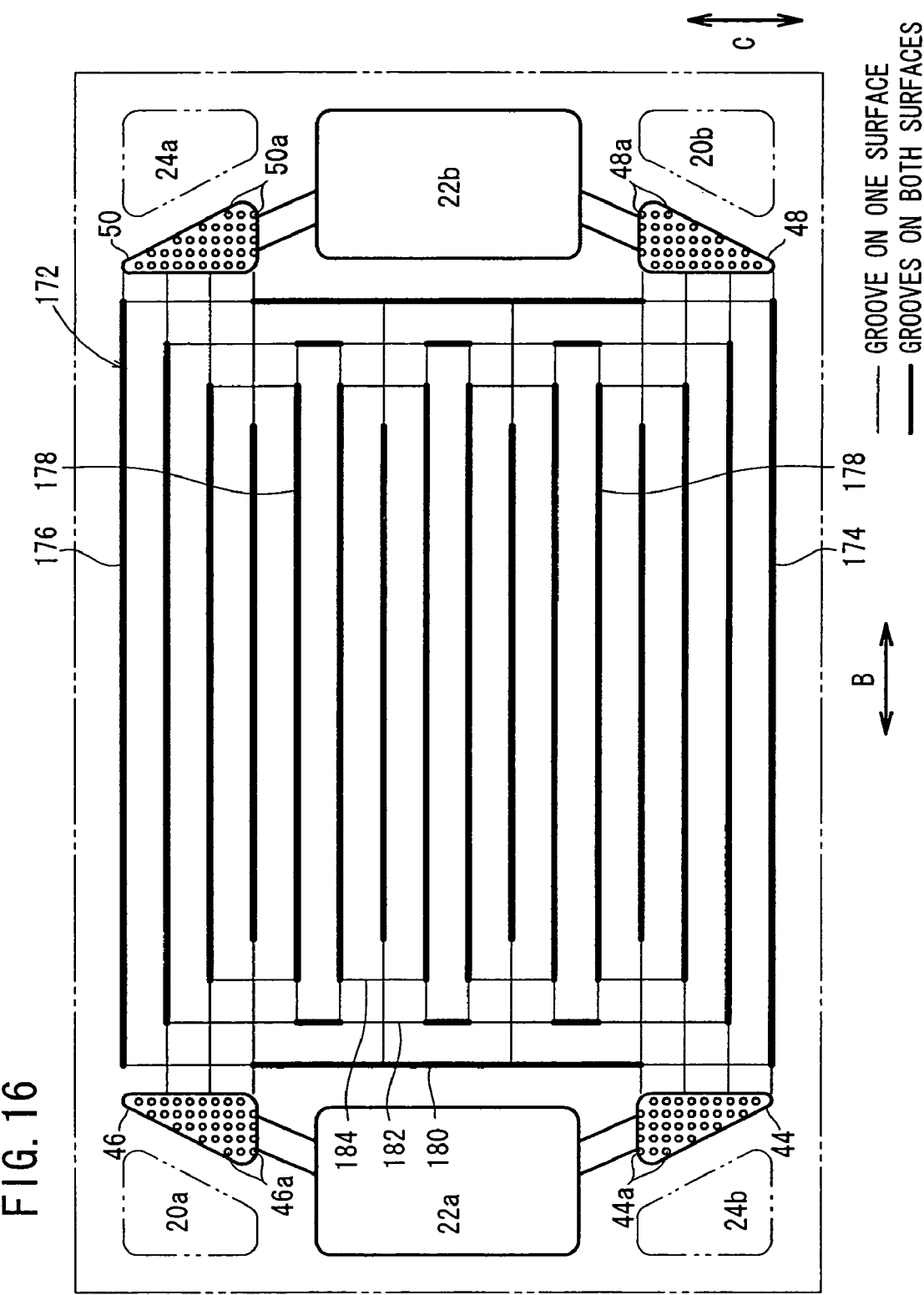
FIG. 16 is a front view showing a coolant flow field formed between the first and second metal plates.

A coolant flow field 172 is formed between the first and second metal plates 160, 166. As shown in FIG. 16, the coolant flow field 172 includes inlet buffers 44, 46 connected to the coolant supply passage 22a and outlet buffers 48, 50 connected to the coolant discharge passage 22b. The inlet buffer 44 and the outlet buffer 48 are connected by four straight flow grooves 174 extending in the direction indicated by the arrow B. Further, the inlet buffer 46 and the outlet buffer 50 are connected by four straight flow grooves 176 extending in the direction indicated by the arrow B.

Eight straight flow grooves 178 are formed in parallel in the direction indicated by the arrow B between the straight flow grooves 174, 176. The straight flow grooves 174 through 178 are connected together by two straight flow grooves 180 extending in the direction indicated by the arrow C. Further, the straight flow grooves 174 through 178 are connected by the two straight flow grooves 182 which are shorter than the straight flow groove 174, and two straight flow grooves 184 which are extending discontinuously, and shorter than the straight flow grooves 182.

The coolant flow field 172 is partially defined by the first metal plate 160, and partially defined by the second metal plate 166. Specifically, as shown in FIG. 14, on the surface 160b of the first metal plate 160, the inlet buffer 44 and the outlet buffer 50 are formed at positions where the inlet buffer 34 and the outlet buffer 36 are not formed. On the surface 160b, grooves 174a through 178a of the straight flow grooves 174 through 178 extending in the direction indicated by the arrow B are formed, and grooves 180a through 184a of the straight flow grooves 180 through 184 extending in the direction indicated by the arrow C are formed. The grooves 174a through 184a are formed at predetermined positions where the serpentine oxygen-containing gas flow grooves 164a through 164c are not formed.

As shown in FIG. 15, the inlet buffer 46 and the outlet buffer 48 are formed on the surface 166b of the second metal plate 166 where the outlet buffer 100 and the inlet buffer 98 are not formed. On the surface 166b, the grooves 174b through 184b as part of the straight flow grooves 174 through 184 are formed at positions where the fuel gas flow grooves 170a through 170c are not affected. Unillustrated line seals are formed between the surfaces 160b, 166b.

In this manner, the same advantages as with the first and second embodiments can be obtained. For example, even though the shapes of the grooves are constrained, the grooves compensate with each other to form the coolant flow field 172 having the desired flow field structure as a whole.

Further, each of the oxygen-containing gas flow field 162 and the fuel gas flow field 168 have the flow field structure in which four turn regions and five straight regions are formed along the electrode surface. Therefore, the grooves in the flow field are long, the gas flow rate is high, and the gas pressure loss is large. Thus, the water produced in the power generation is discharged efficiently.

Figure 17:
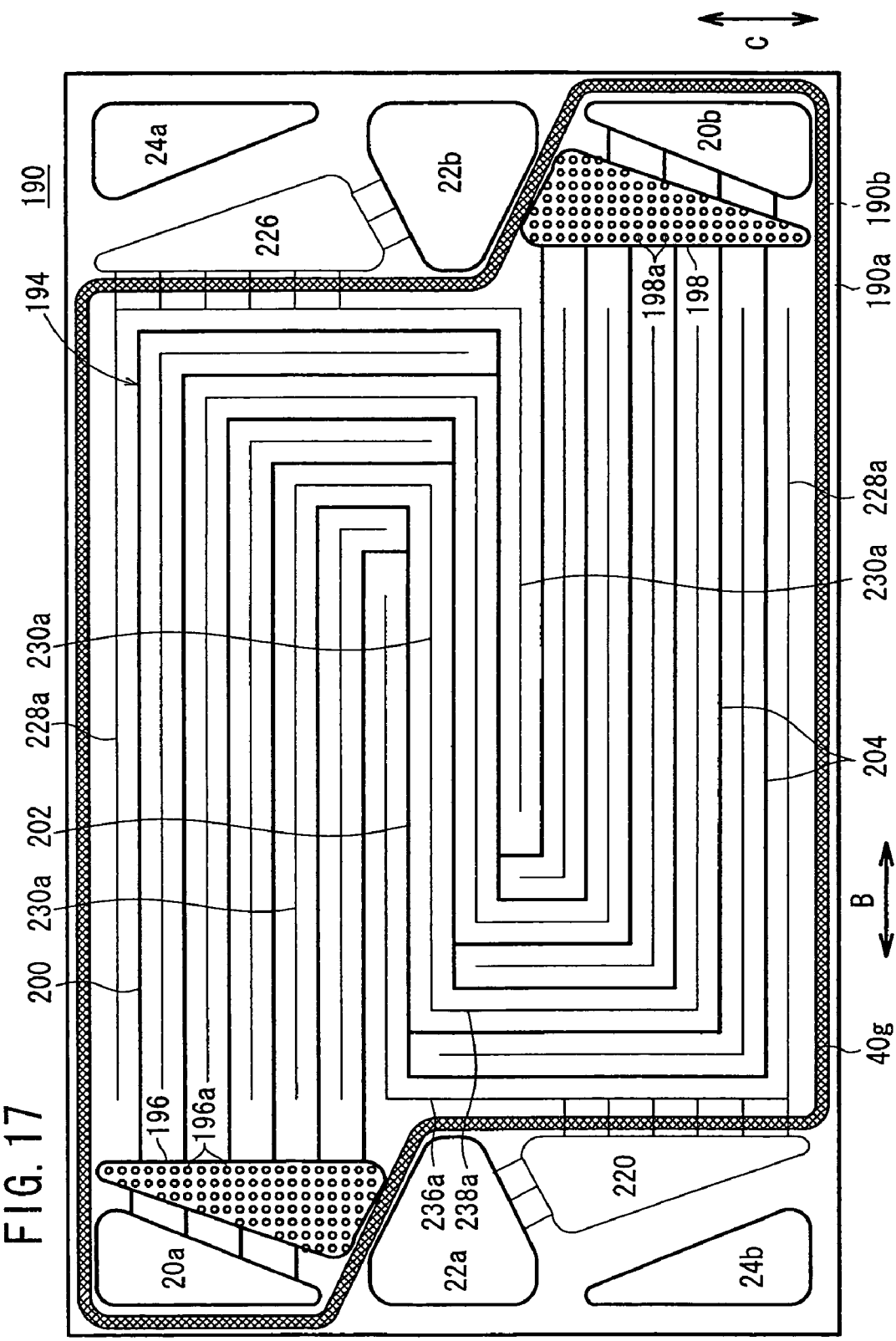
FIG. 17 is a front view of first metal plate of a fuel cell according to a fourth embodiment of the present invention.
Figure 18:
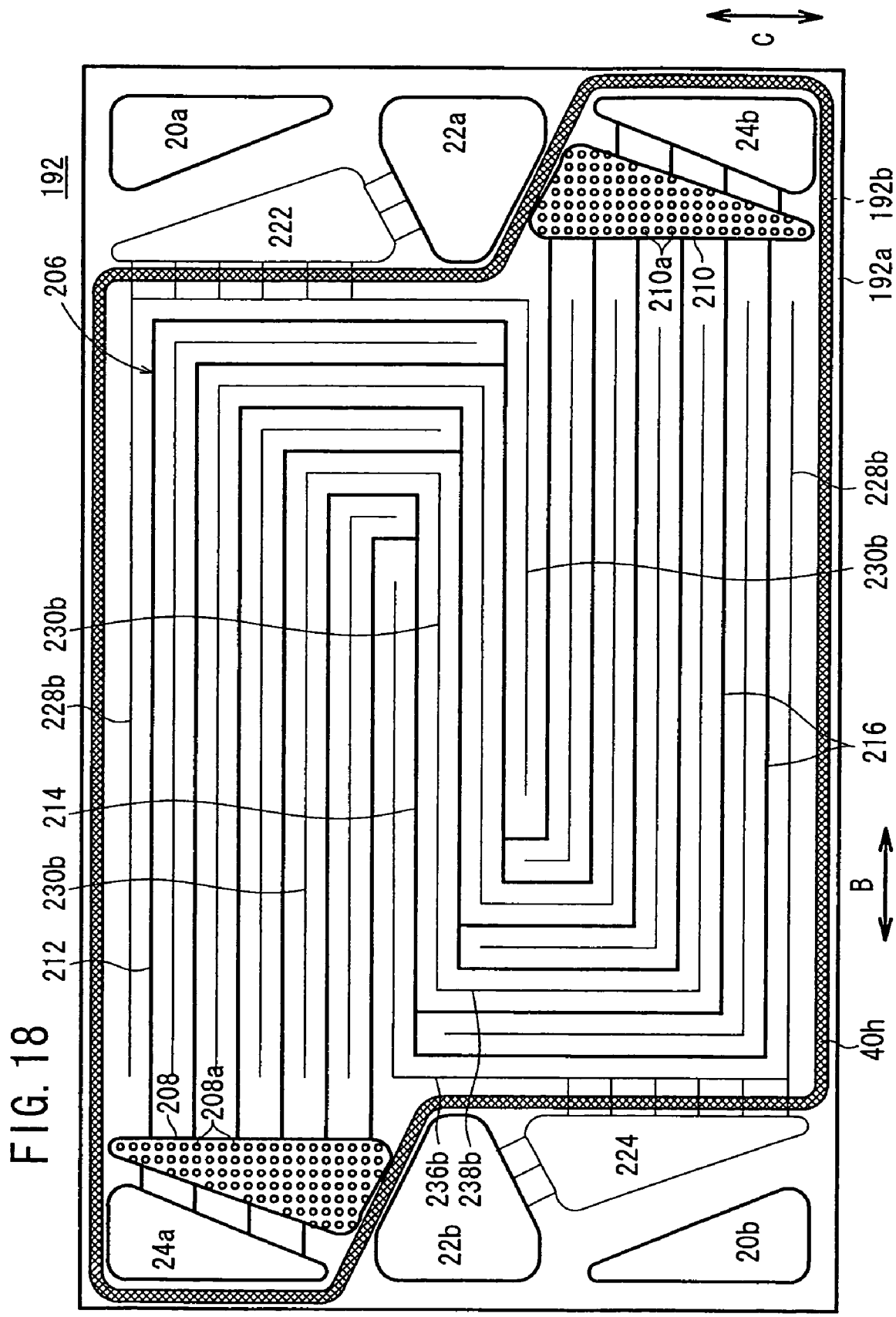
FIG. 18 is a front view showing a second metal plate of the fuel cell.

FIG. 17 is a front view of a first metal plate 190 of a fuel cell according to a fourth embodiment of the present invention. FIG. 18 is a front view of a second metal plate 192 stacked on the first metal plate 190.

The first metal plate 190 has an oxygen-containing gas flow field 194 on its surface 190a facing the cathode 30. The oxygen-containing gas flow field 194 includes an inlet buffer 196 connected to the oxygen-containing gas supply passage 20a and an outlet buffer 198 connected to the oxygen-containing gas discharge passage 20b. A plurality of bosses 196a, 198a are formed in the inlet buffer 196 and the outlet buffer 198, respectively. Each of the inlet buffer 196 and the outlet buffer 198 is elongated in the direction indicated by the arrow C.

The inlet buffer 196 is connected to six oxygen-containing gas flow grooves 200. After the oxygen-containing gas flow grooves 200 extend in the direction in the arrow B, the oxygen-containing gas flow grooves 200 are curved in the direction in the arrow C. Then, every two of the oxygen-containing gas grooves 200 are joined together into the oxygen-containing gas flow grooves 202, and extend in the direction indicated by the arrow B. Every oxygen-containing gas flow grooves 202 is separated into two grooves, i.e., the oxygen-containing gas flow grooves 202 are separated into six oxygen-containing gas flow grooves 204. The oxygen-containing gas flow grooves 204 are curved from the direction indicated by the arrow C to the direction indicated by the arrow B. Then, the oxygen-containing gas flow grooves 204 are connected to the outlet buffer 198.

As shown in FIG. 18, the second metal plate 192 has a fuel gas flow field 206 on its surface 192a facing the anode 28. The fuel gas flow field 206 includes an inlet buffer 208 connected to the fuel gas supply passage 24a and an outlet buffer 210 connected to the fuel gas discharge passage 24b. A plurality of bosses 208a, 210a are formed in the inlet buffer 208, and the outlet buffer 210, respectively. Each of the inlet buffer 208 and the outlet buffer 210 is elongated in the direction indicated by the arrow C.

The inlet buffer 208 is connected to six fuel gas flow grooves 212. After the fuel gas flow grooves 212 extend in the direction indicated by the arrow B, the fuel gas flow grooves 212 are curved in the direction indicated by the arrow C. Every two of the fuel gas flow grooves 212 are joined together to form three fuel gas flow grooves 214. After the fuel gas flow grooves 214 extend in the direction indicated by the arrow B, every fuel gas flow groove 214 is separated into two grooves to form six fuel gas flow grooves 216. After the fuel gas flow grooves 216 extend in the direction indicated by the arrow C, the fuel gas flow grooves 216 are curved in the direction indicated by the arrow B, and connected to the outlet buffer 210.

Figure 19:
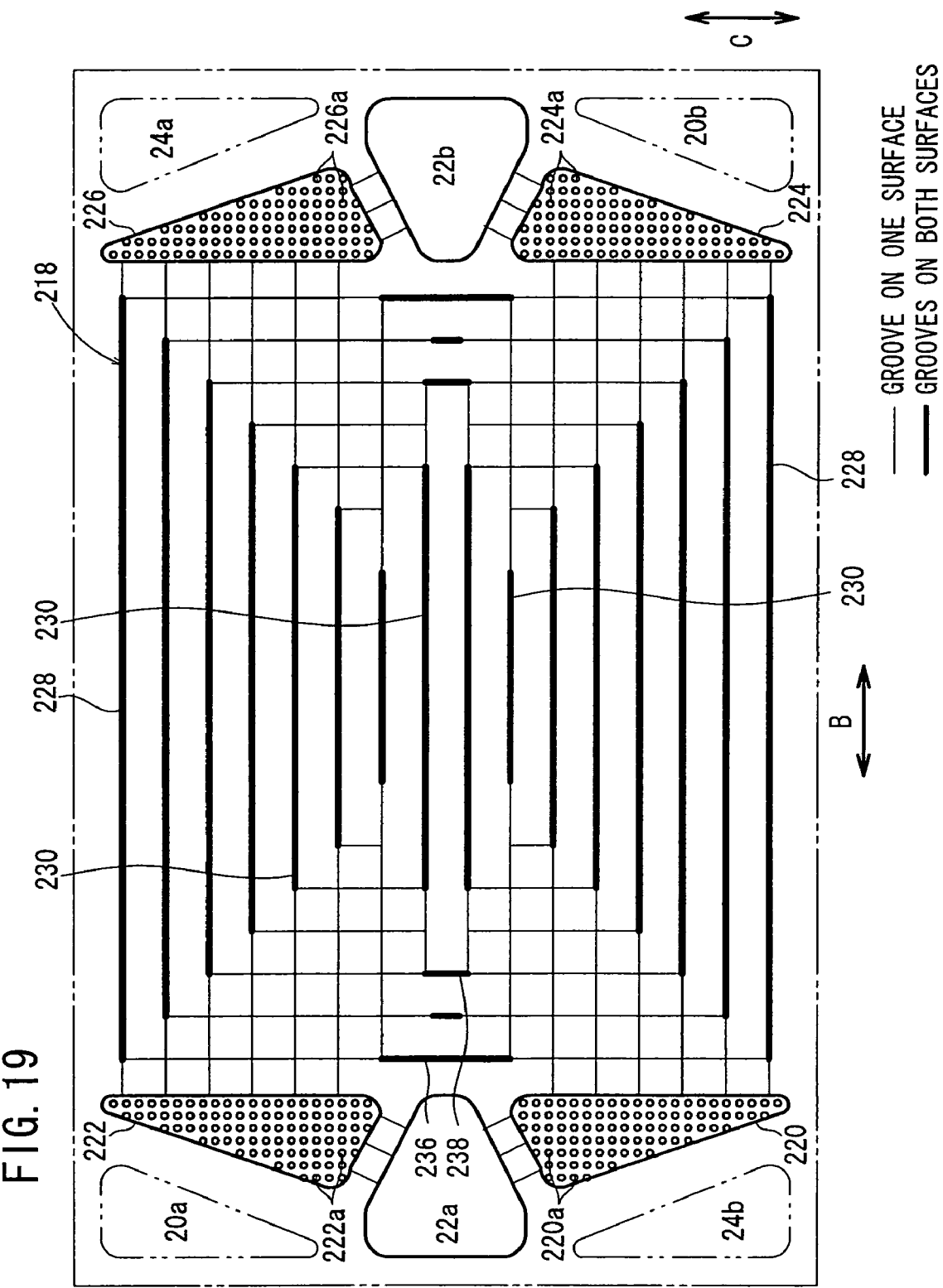
FIG. 19 is a front view showing a coolant flow field formed between the first and second metal plates.

A coolant flow field 218 is formed between a surface 190b of the first metal plate 190 and a surface 192b of the second metal plate 192. As shown in FIG. 19, the coolant flow field 218 includes two inlet buffers 220, 222 connected to the coolant supply passage 22a and elongated in the direction indicated by the arrow C, and outlet buffers 224, 226 connected to the coolant discharge passage 22b and elongated in the direction indicated by the arrow C. A plurality of bosses 220a, 222a, 224a 226a are formed in the inlet buffers 220, 222, and the outlet buffers 224, 226, respectively.

The inlet buffer 220 is directly connected to the outlet buffer 224 by six straight flow grooves 228 extending in the direction indicated by the arrow B, and the inlet buffer 222 is directly connected to the outlet buffer 226 by six straight flow grooves 228 extending in the direction indicated by the arrow B. Four straight flow grooves 230 are provided on the surface 190a. Each of the straight flow grooves 230 has open ends, and extends in the direction indicated by the arrow B.

Two straight flow grooves 236 elongated in the direction arrow C are formed near the inlet buffers 220, 222, and the outlet buffers 224, 226. Eight straight flow grooves 238 each having a predetermined length are formed between the straight flow grooves 236.

The coolant flow field 218 is partially defined by the first metal plate 190, and partially defined by the second metal plate 192. As shown in FIG. 17, on the surface 190b of the first metal plate 190, the inlet buffer 220 and the outlet buffer 226 are formed, and the grooves 228a, 230a, 236a, 238a as part of the straight flow grooves 228, 230, 236, 238 are formed.

As shown in FIG. 18, on the surface 192b of the second metal plate 192, the inlet buffer 222 and the outlet buffer 224 are formed, and the grooves 228b, 230b, 236b, 238b as part of the straight flow grooves 228, 230, 236, 238 are formed. Line seals 40g, 40h are formed on the surfaces 190a, 192a, and unillustrated line seals are provided between the surfaces 190b, 192b.

In the fourth embodiment, the number of grooves in the oxygen-containing gas flow field 194 and the number of grooves in the fuel gas flow field 206 change from six to three, and three to six. Therefore, the inlet buffer 196 and the outlet buffer 198 for the oxygen-containing gas and the inlet buffer 208 and the outlet buffer 210 for the fuel gas, and the inlet buffers 220, 222 and the outlet buffers 224, 226 for the coolant are elongated respectively in the direction indicated by the arrow C. Thus, it is possible to supply the oxygen-containing gas, the fuel gas, and the coolant more uniformly and smoothly along the electrode surfaces.

Figure 20:
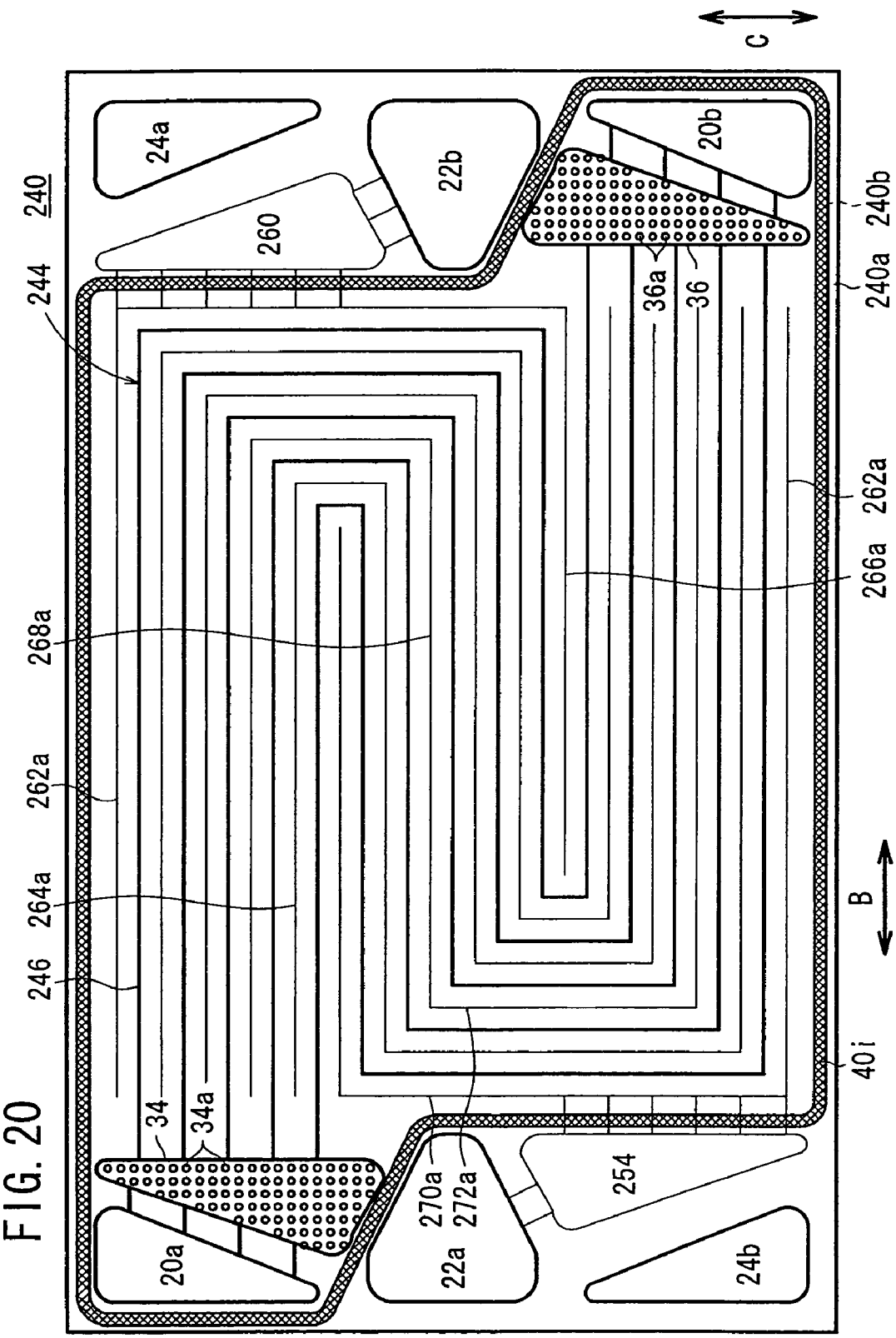
FIG. 20 is a front view showing a first metal plate of a fuel cell according to a fifth embodiment of the present invention.
Figure 21:
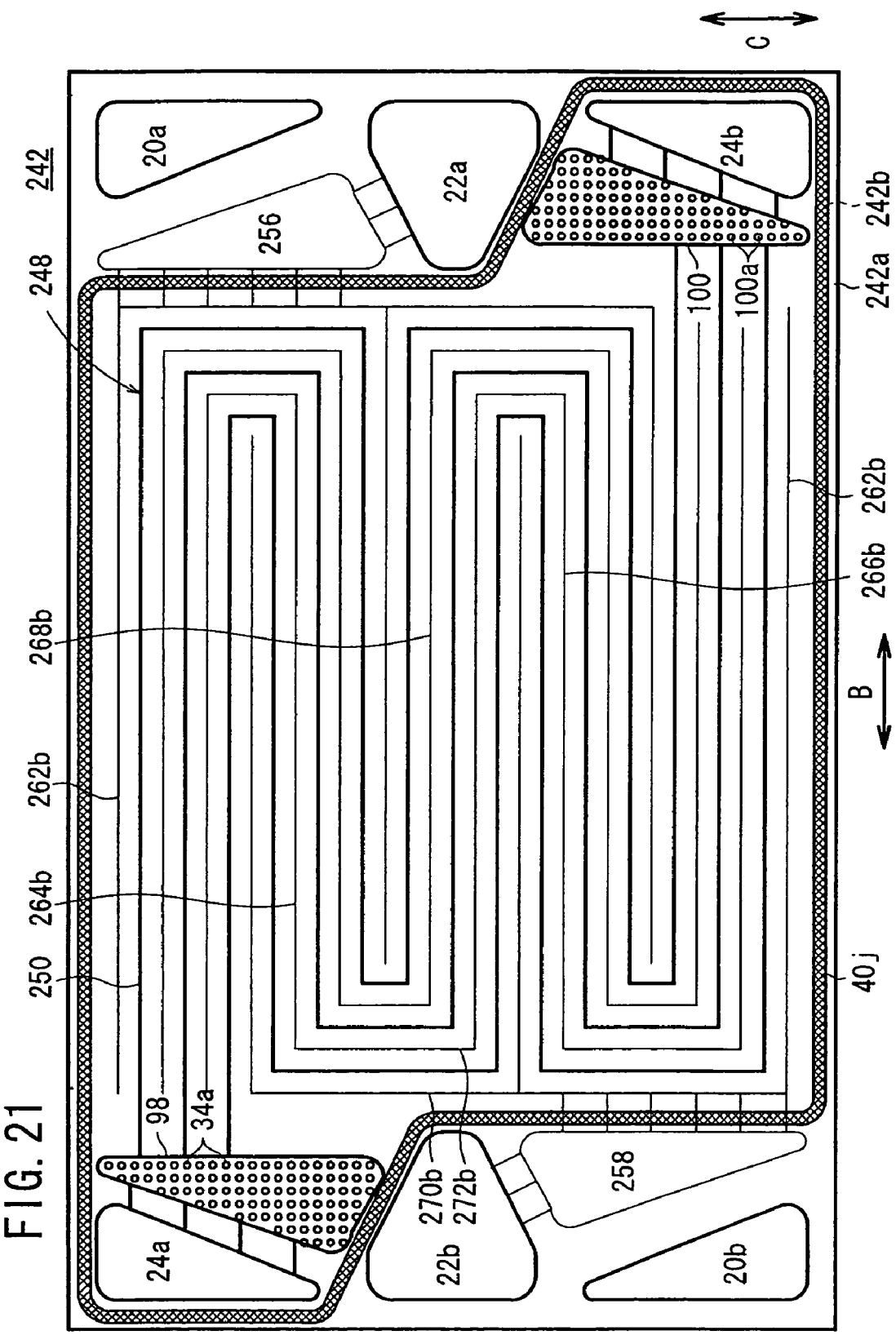
FIG. 21 is a front view of a second metal plate of the fuel cell.

FIG. 20 is a front view showing a first metal plate 240 of a fuel cell according to a fifth embodiment. FIG. 21 is a front view showing a second metal plate 242 stacked on the first metal plate 240.

The first metal plate 240 has an oxygen-containing gas flow field 244 on its surface 240a facing the cathode. The oxygen-containing gas flow field 244 includes four oxygen-containing gas flow grooves 246. Each of the oxygen-containing gas flow grooves 246 has a serpentine pattern having two turn regions and three straight regions for allowing the oxygen-containing gas to flow back and forth in the direction indicated by the arrow B. The oxygen-containing gas flow grooves 246 are connected between the inlet buffer 34 and the outlet buffer 36.

As shown in FIG. 21, the second metal plate 242 has a fuel gas flow field 248 on its surface 242a facing the anode 28. The fuel gas flow field 248 includes three fuel gas flow grooves 250. The fuel gas flow grooves 250 has a serpentine pattern having four turn regions and five straight regions for allowing the fuel gas to flow back and forth in the direction indicated by the arrow B. The fuel gas flow grooves 250 are connected between an inlet buffer 98 and an outlet buffer 100.

Figure 22:
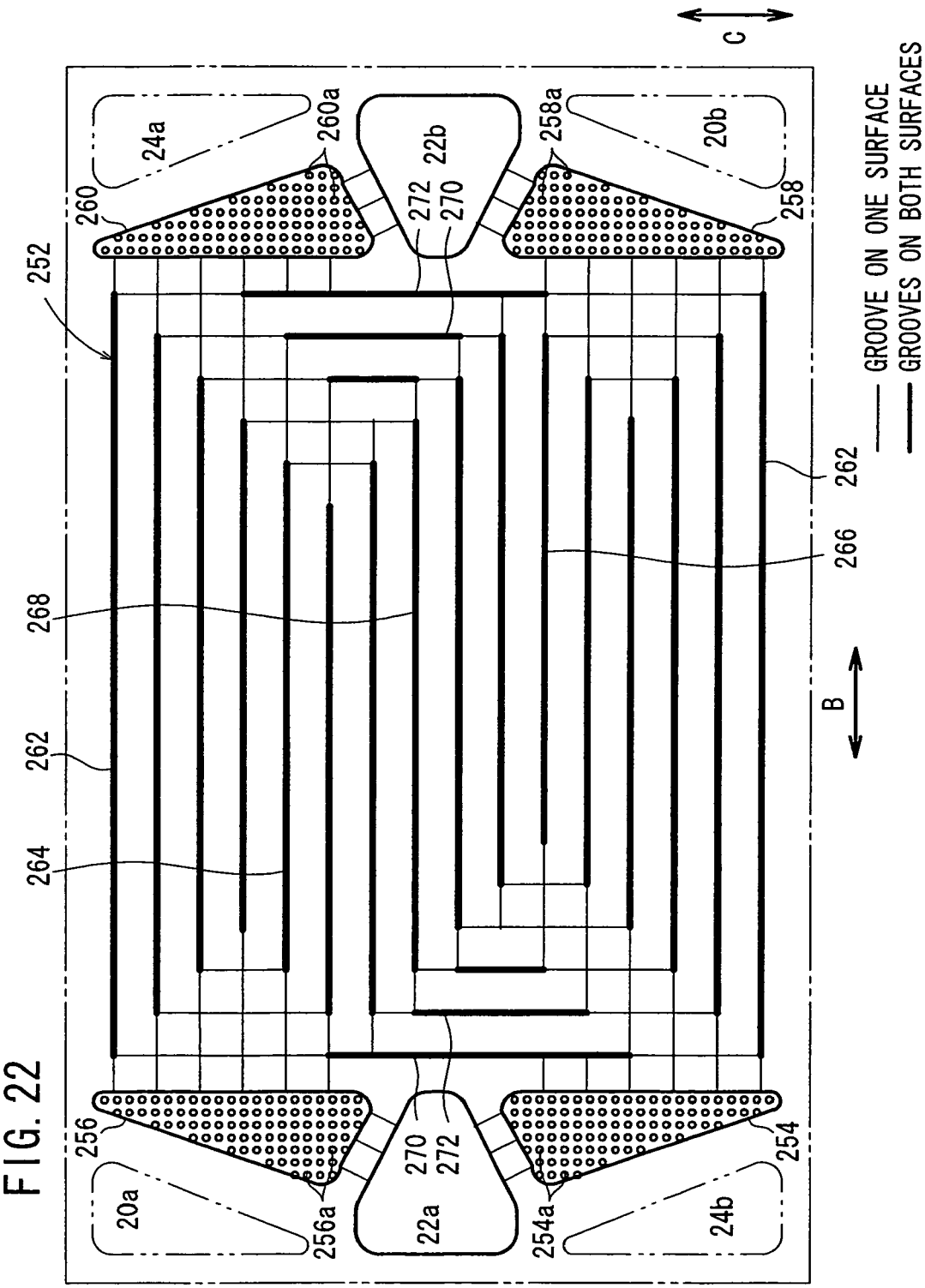
FIG. 22 is a front view showing a coolant flow field formed between the first and second metal plates.

A coolant flow field 252 is connected between the first and second metal plates 240, 242. As shown in FIG. 22, the coolant flow field 252 includes inlet buffers 254, 256 connected to the coolant supply passage 22a, and outlet buffers 258, 260 connected to the coolant discharge passage 22b. A plurality of bosses 254a, 256a are formed in the inlet buffers 254, 256, respectively, and a plurality of bosses 258a, 260a are formed in the outlet buffers 258, 260, respectively.

The inlet buffer 254 and the outlet buffer 258 are connected directly by four straight grooves 262 extending in the direction indicated by the arrow B, and the inlet buffer 256 and the outlet buffer 260 are connected by four straight grooves 262 extending in the direction indicated by the arrow B. Ends of two straight flow grooves 264 are connected to the inlet buffer 256, and the other ends of the straight flow grooves 264 terminate at an area adjacent to the outlet buffer 260. Ends of two straight flow grooves 266 are connected to the outlet buffer 258, and the other ends of the straight flow grooves 266 terminate at an area adjacent to the inlet buffer 254. Further, four straight flow grooves 268 extending in the direction indicated by the arrow B are provided. Both ends of the straight flow grooves 268 are open.

Straight flow grooves 270 elongated in the direction indicated by the arrow C are provided near the inlet buffers 254, 256, and near the outlet buffers 258, 260. Further, eight straight flow grooves 272 each having a predetermined length in the direction indicated by the arrow C are formed between the straight flow grooves 270.

The surface 240b of the first metal plate 240 and the surface 242b of the second metal plate 242 face each other. The coolant flow field 252 is partially defined on the surface 240b of the first metal plate 240, and partially defined on the surface 242b of the second metal plate 242. As shown in FIG. 20, the inlet buffer 254 and the outlet buffer 260 are formed on the surface 240b of the first metal plate 240. Further, grooves 262a through 272a as part of the straight flow grooves 262 through 272 are formed on the surface 240b of the first metal plate 240.

As shown in FIG. 21, the inlet buffer 256 and the outlet buffer 258 are formed on the surface 242b of the second metal plate 242. Further, grooves 262b through 272b as part of the straight flow grooves 262 through 272 are formed on the surface 242a of the second metal plate 242. Line seals 40i, 40j are formed on the surfaces 240a, 242a. Unillustrated line seals are provided between the surfaces 240b, 242b.

The fifth embodiment is advantageous in that even if the oxygen-containing gas flow field 244 and the fuel gas flow field 248 formed on the first and second metal plates 240, 242 have different shapes, it is possible to form the coolant flow field 252 having a predetermined shape between the first and second metal plates 240, 242.

Figure 23:
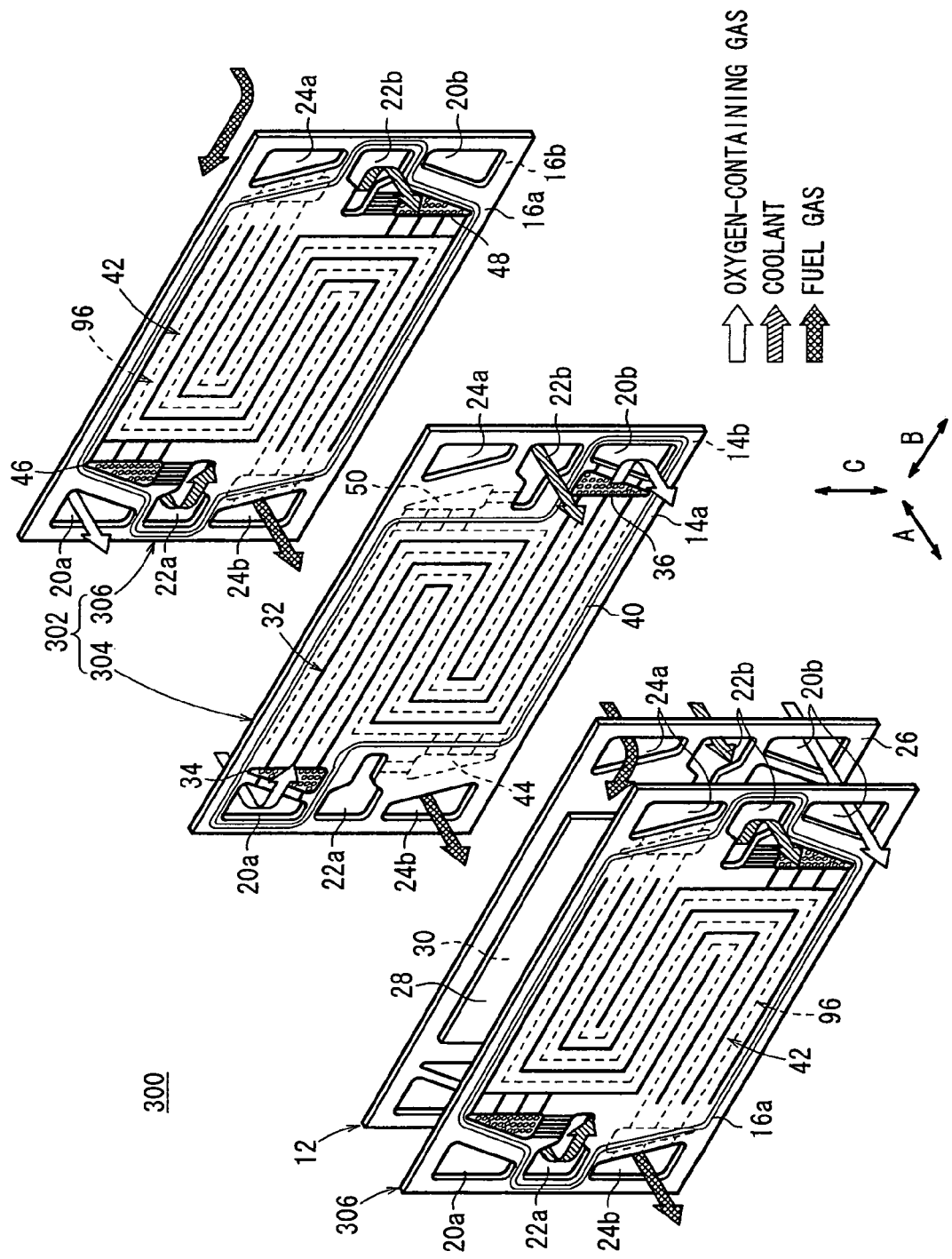
FIG. 23 is an exploded perspective view showing main components of a fuel cell according to a sixth embodiment of the present invention.

FIG. 23 is an exploded perspective view showing main components of a fuel cell 300 according to a sixth embodiment of the present invention.

The fuel cell 300 is formed by stacking the membrane electrode assembly 12 and separators 302 alternately. The separator 302 includes first and second metal plates 304, 306 which are stacked together.

Figure 24:
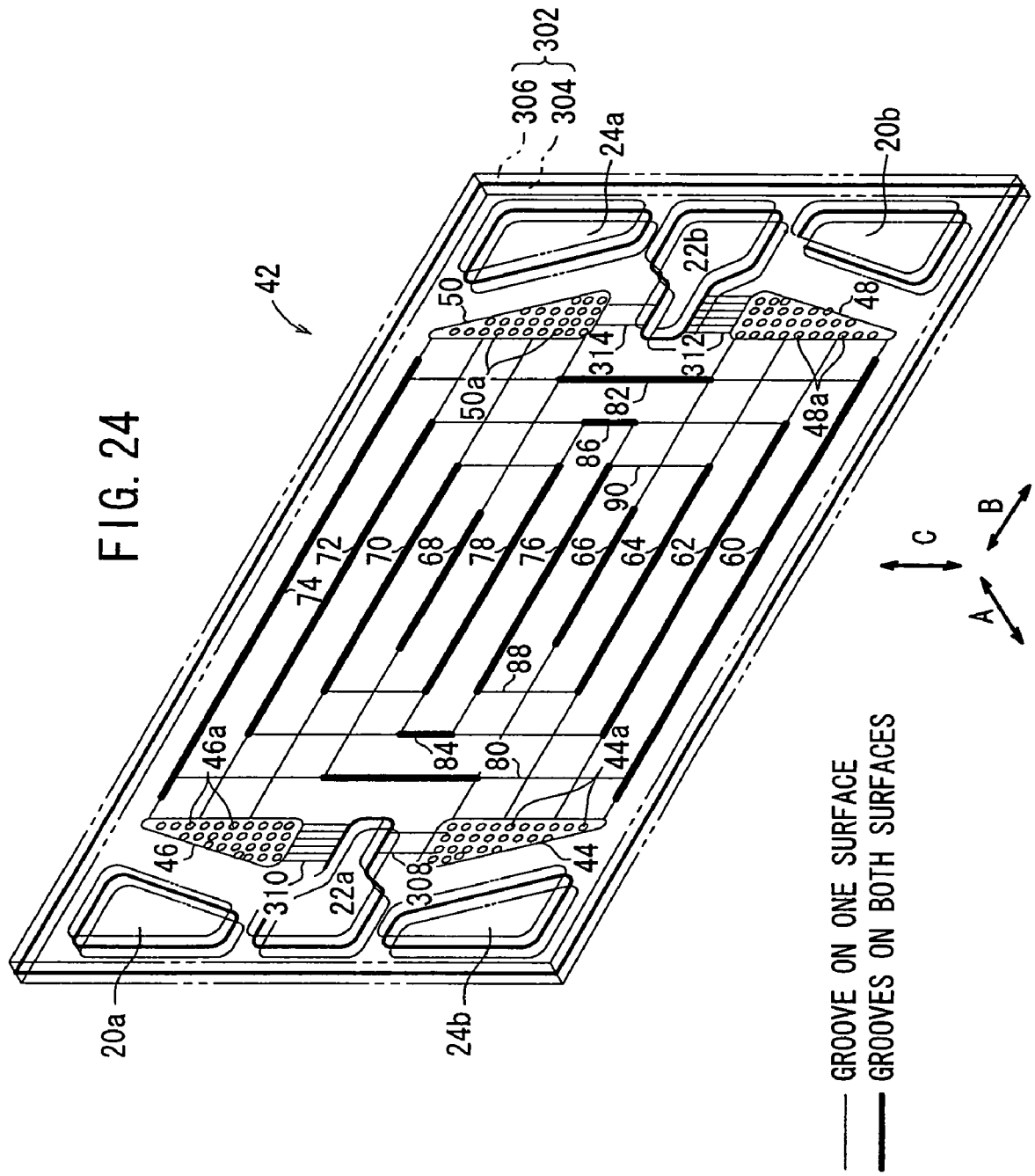
FIG. 24 is a perspective view showing a coolant flow field formed in a separator.

As shown in FIG. 24, the coolant supply passage 22a is connected to the first inlet buffer 44 through a first inlet connection passage 308, and connected to the second inlet buffer 46 through a second inlet connection passage 310. The coolant discharge passage 22b is connected to the first outlet buffer 48 through a first outlet connection passage 312, and connected to the second outlet buffer 50 through a second outlet connection passage 314. The first inlet connection passage 308 comprises, for example, two flow grooves, and the second inlet connection passage 310 comprises, for example, six flow grooves. Likewise, the first outlet connection passage 312 comprises six flow grooves, and the second outlet connection passage 314 comprises two flow grooves.

The number of flow grooves in the first inlet connection passage 308 is not limited to "two", and the number of flow grooves in the second inlet connection passage 310 is not limited to "six". Likewise, the number of flow grooves in the first outlet connection passage 312 is not limited to "six", and the number of flow grooves in the second outlet connection passage 314 is not limited to "two".

In the sixth embodiment, the first and second inlet connection passages 308, 310 connecting the coolant supply passage 22a and the inlet buffers 44, 46 are provided. For example, the first inlet connection passage 308 comprises two flow grooves, and the second inlet connection passage 310 includes six flow grooves. Likewise, the first and second outlet connection passages 312, 314 connecting the coolant discharge passage 22*b* and the outlet buffers 48, 50 are provided. For example, the first outlet connection passage 312 comprises six flow grooves, and the second outlet connection passage 314 comprises two flow grooves.

Figure 25:
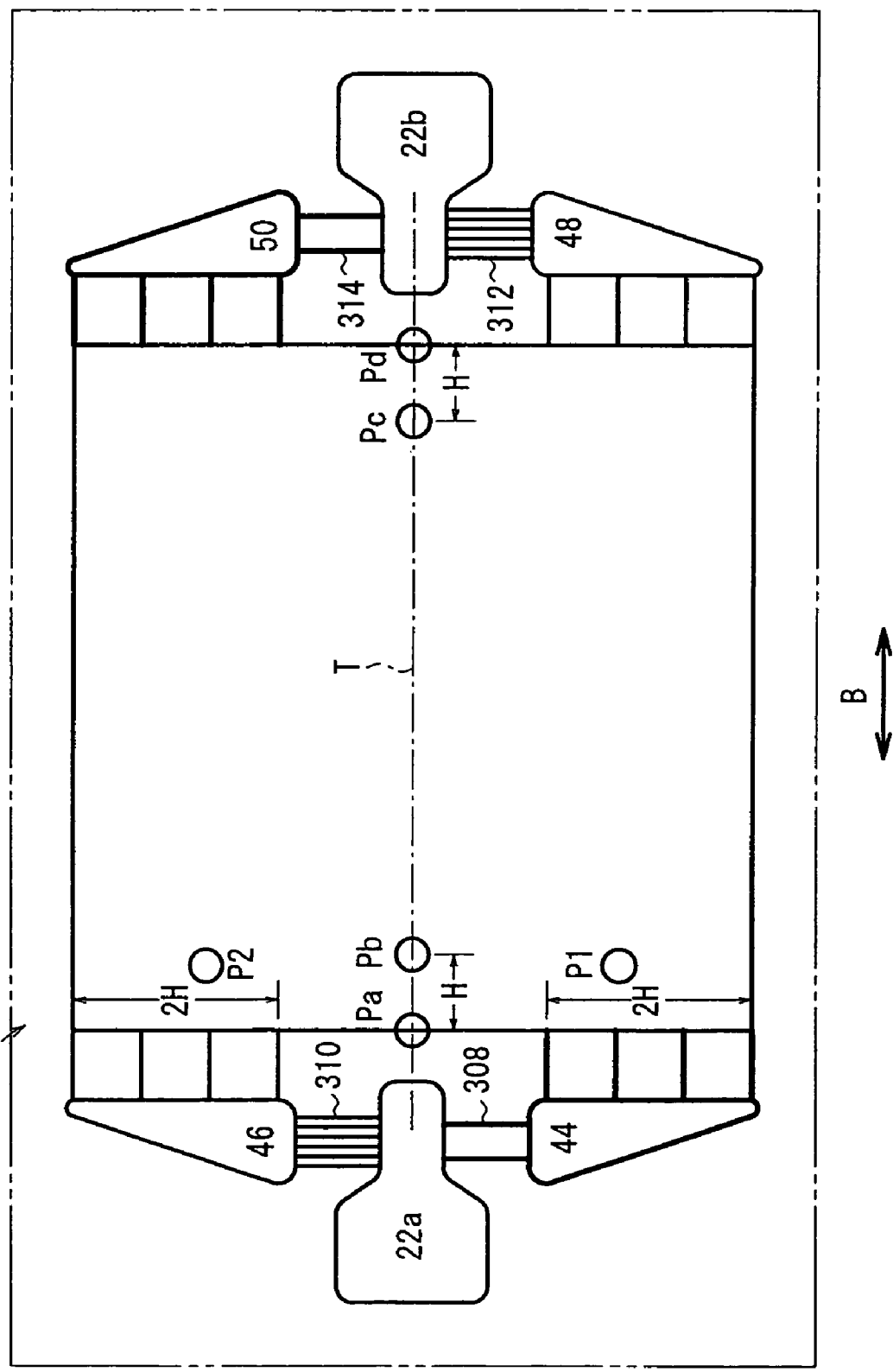
FIG. 25 is a view showing measured positions in the coolant flow field.

Therefore, as shown in FIG. 25, assuming that a position near the inlet buffer 44 is defined as the position P1, and a position near the inlet buffer 46 is defined as the position P2, the flow resistance from the coolant supply passage 22*a* to the position P1 is larger than the flow resistance from the coolant supply passage 22*a* to the position P2. Therefore, the pressure of the coolant applied to the position P2 is larger than the pressure of the coolant applied to the position P1. Thus, the coolant flows from the position P2 to the position P1. It is possible to prevent stagnation of the coolant, and produce the flow of the coolant from the position P2 to the position P1 in the coolant flow field 42.

The flow rate and temperature distribution in the coolant flow field 42 were confirmed in a comparative example and the sixth embodiment. In the comparative example, the number of flow grooves of the first inlet connection passage 308 and the number of flow grooves of the second inlet connection passage 310 are the same, and the number of the flow grooves of the first outlet connection passage 312 and the number of flow grooves of the second outlet connection passage 314 are the same. The confirmation was made around positions Pa, Pb, Pc, and Pd along a central line T connecting the coolant supply passage 22*a* and the coolant discharge passage 22*b*. As shown in FIG. 25, the positions Pa, Pd are end positions of the coolant flow field 42. The distance (H) between the position Pb and the position Pa and the distance (H) between the position Pc and the position Pd were set to ½ of the entire flow field width (2H) of the coolant flow field 42.

As a result, in the comparative example, since the pressure at the position P1 and the pressure at the position P2 were substantially the same, as shown in FIG. 26, near the position Pa, the pressure of the coolant supplied from the inlet buffer 44 was in equilibrium with the pressure of the coolant supplied from the inlet buffer 46. Therefore, the flow rate of the coolant was small near the positions Pa to Pd on the central line T. In contrast, in the sixth embodiment, since the pressure at the position P2 is higher than the pressure at the position P1, the pressure difference created the flow of the coolant from the position P2 to the position P1.

Further, as shown in FIG. 27, in the comparative example, the temperature was high near the positions Pa, Pb and the positions Pc, Pd since the coolant did not flow smoothly. In contrast, in the sixth embodiment, the coolant flowed smoothly by the pressure difference. Therefore, in the temperature distribution of the sixth embodiment, the temperature increased from the coolant supply passage 22*a* to the coolant discharge passage 22*b*.

Thus, in the sixth embodiment, the coolant flows smoothly and reliably in the coolant flow field 42. It is possible to uniformly and reliably cool the entire power generation surface of the membrane electrode assembly 12.

In the sixth embodiment, the number of the flow grooves of the first inlet connection passage 308 is smaller than the number of the flow grooves of the second inlet connection passage 310. Conversely, the number of the flow grooves of the first inlet connection passage 308 may be larger the number of the flow grooves of the second outlet connection passage 310. Likewise, the number of the flow grooves of the second outlet connection passage 314 may be larger the number of the flow grooves of the first outlet connection passage 312. In the sixth embodiment, the numbers of the flow grooves are two and six. However, the present invention is not limited in this respect. As long as the numbers of the flow grooves are different, various combinations of numbers may be adopted.

The present invention is not limited to the above first through sixth embodiments. For example, three or more inlet buffers connected to the coolant supply passage 22*a*, and three or more outlet buffers connected to the coolant discharge passage 22*b* can be provided.

In the fuel cell according to the present invention, the coolant flows between the first and second metal plates of the separator. The coolant is supplied from the coolant supply passage separately into two or more inlet buffers. After the coolant flows through the straight flow grooves into two or more outlet buffers, the coolant is discharged into the coolant discharge passage. Therefore, the coolant flows along the surface of the separator uniformly, and cools the separator surface uniformly. Thus, the stable power generation performance can be achieved.

Further, in the present invention, the numbers of the flow grooves of the respective inlet connection passages are different, and the number of the flow grooves of the respective outlet connection passages are different. Thus, the desired flow rate and the desired flow condition of the coolant in the coolant flow field are achieved. Accordingly, the coolant flows in the separator surface uniformly, and cools the entire electrode surface uniformly. Thus, the stable power generation performance can be achieved.

The invention claimed is:

1. A fuel cell formed by stacking an electrolyte electrode assembly and separators alternately, said electrolyte electrode assembly including an anode and a cathode and an electrolyte interposed between said anode and said cathode, wherein a fuel gas supply passage, an oxygen-containing gas supply passage, a coolant supply passage, a fuel gas discharge passage, an oxygen-containing gas discharge passage, and a coolant discharge passage extend through said fuel cell in a stacking direction of said fuel cell;

said separator at least includes first and second plates stacked together;

said first metal plate has an oxygen-containing gas flow field including a curved flow passage for supplying an oxygen-containing gas along said cathode, and said second metal plate has a fuel gas flow field including a curved flow passage for supplying a fuel gas along said anode; and a coolant flow field including:

two or more inlet buffers separate from each other connected to said coolant supply passage, at least one inlet buffer disposed on a first side of said coolant supply passage and at least another inlet buffer disposed on a second side of said coolant supply passage, two or more outlet buffers separate from each other connected to said coolant discharge passage, at least one outlet buffer disposed on a first side of said coolant discharge passage and at least another outlet buffer disposed on a second side of said coolant discharge passage, and straight flow grooves connected between said inlet buffers and said outlet buffers is provided between said first and second metal plates.

2. A fuel cell according to claim 1, wherein a first inlet buffer connected to said coolant supply passage and a first outlet buffer connected to said coolant discharge passage are formed on said first metal plate; and a second inlet buffer connected to said coolant supply passage and a second outlet buffer connected to said coolant discharge passage are formed on said second metal plate at positions different from positions of said first inlet buffer and said first outlet buffer.

3. A fuel cell according to claim 1, wherein said fuel gas flow field includes an inlet buffer connected to said fuel gas supply passage, an outlet buffer connected to said fuel gas discharge passage, and a curved flow groove extending along said second metal plate and connected between said inlet buffer and said outlet buffer; and said fuel gas flow field includes an inlet buffer connected to said oxygen-containing gas supply passage, an outlet buffer connected to said oxygen-containing gas discharge passage, and a curved flow groove extending along said first metal plate, and connected between said inlet buffer and said outlet buffer.

4. A fuel cell according to claim 1, wherein each of said fuel gas flow field and said oxygen-containing gas flow field includes a serpentine flow passage.

5. A fuel cell according to claim 4, wherein the number of grooves in said serpentine flow passage decreases, and then, increases.

6. A fuel cell according to claim 1, wherein each of said fuel gas flow field and said oxygen-containing gas flow field includes a substantially U-shaped flow passage.

7. A fuel cell according to claim 1, wherein each of said first and second metal plates has a horizontally long rectangular shape, and stacked in a horizontal direction.

8. A fuel cell according to claim 7, wherein among six passages comprising said fuel gas supply passage, said oxygen-containing gas supply passage, said coolant supply passage, said fuel gas discharge passage, said oxygen-containing gas discharge passage, and said coolant discharge passage, three passages extend through a left end of said first and second metal plates, and the other three passages extend through a right end of said first and second metal plates.

9. A fuel cell formed by stacking an electrolyte electrode assembly and separators alternately, said electrolyte electrode assembly including an anode and a cathode and an electrolyte interposed between said anode and said cathode, wherein a reactant gas supply passage, a coolant supply passage, a reactant gas discharge passage, and a coolant discharge passage extend through said fuel cell in a stacking direction of said fuel cell;

said separator at least includes first and second metal plates stacked together, and a coolant flow field is formed between said first and second metal plates;

said coolant flow field includes two or more inlet buffers separate from each other connected to said coolant supply passage through inlet connection passages, two or more outlet buffers separate from each other connected to said coolant discharge passage through outlet connection passages, and flow grooves connected between said two or more inlet buffers and said two or more outlet buffers;

at least the number of grooves in a first inlet connection passage connecting said first inlet buffer to said coolant supply passage and the number of grooves in a second inlet connection passage connecting said second inlet buffer to said coolant supply passage are different; and at least the number of grooves in a first outlet connection passage connecting said first outlet buffer to said coolant discharge passage and the number of grooves in a second outlet connection passage connecting said second outlet buffer to said coolant discharge passage are different.

10. A fuel cell according to claim 9, wherein an oxygen-containing gas flow field including a curved flow passage is formed on one surface of said first metal plate for supplying an oxygen-containing gas along said cathode, and a fuel gas flow field including a curved flow passage is formed on one surface of said second metal plate for supplying a fuel gas along said anode; and a first inlet buffer connected to said coolant supply passage and a first outlet buffer connected to said coolant discharge passage are formed on the other surface of said first metal plate; and a second inlet buffer connected to said coolant supply passage and a second outlet buffer connected to said coolant discharge passage are formed on the other surface of said second metal plate at positions different from positions of said first inlet buffer and said first outlet buffer.

11. A fuel cell according to claim 9, wherein each of said fuel gas flow field and said oxygen-containing gas flow field includes a serpentine flow passage.

12. A fuel cell according to claim 9, wherein each of said first and second metal plates has a horizontally long rectangular shape, and stacked in a horizontal direction.

13. A fuel cell according to claim 12, wherein said reactant gas supply passage comprises a fuel gas supply passage and an oxygen-containing gas supply passage, and said reactant gas discharge passage comprises a fuel gas discharge passage and an oxygen-containing gas discharge passage; and among six passages comprising said fuel gas supply passage, said oxygen-containing gas supply passage, said coolant supply passage, said fuel gas discharge passage, said oxygen-containing gas discharge passage, and said coolant discharge passage, three passages extend through a left end of said first and second metal plates, and the other three passages extend through a right end of said first and second metal plates.

14. A fuel cell formed by stacking an electrolyte electrode assembly and separators alternately, said electrolyte electrode assembly including an anode and a cathode and an electrolyte interposed between said anode and said cathode, wherein a fuel gas supply passage, an oxygen-containing gas supply passage, a coolant supply passage, a fuel gas discharge passage, an oxygen-containing gas discharged passage, and a coolant discharge passage extend through said fuel cell in a stacking direction of said fuel cell;

said separator at least includes first and second metal plates stacked together;

said first metal plate has an oxygen-containing gas flow field for supplying an oxygen-containing gas along said cathode, said second metal plate has a fuel gas flow field for supplying a fuel gas along said anode, said oxygen-containing gas flow field includes a serpentine flow passage and said fuel gas flow field includes a serpentine flow passage, and the serpentine flow passage of said oxygen-containing gas flow field and the serpentine flow passage of said fuel gas flow field have the same number of turn regions; and a coolant flow field including:

two or more inlet buffers separate from each other connected to said coolant supply passage, at least one inlet buffer disposed on a first side of said coolant supply passage and at least another inlet buffer disposed on a second side of said coolant supply passage, two or more outlet buffers separate from each other connected to said coolant discharge passage, at least one outlet buffer disposed on a first side of said coolant discharge passage and at least another outlet buffer disposed on a second side of said coolant discharge passage, and straight flow grooves connected between said two or more inlet buffers and said two or more outlet buffers is provided between said first and second metal plates.

15. A fuel cell according to claim 14, wherein among six passages comprising said fuel gas supply passage, said oxygen-containing gas supply passage, said coolant supply passage, said fuel gas discharge passage, said oxygen-containing gas discharge passage, and said coolant discharge passage, three passages extend through a left end of said first and second metal plates, and the other three passages extend through a right end of said first and second metal plates.

\* \* \* \* \*